United States Patent
Yamaguchi et al.

(10) Patent No.: US 9,264,756 B2
(45) Date of Patent: Feb. 16, 2016

(54) PRODUCTION APPARATUS AND CONTENT DISTRIBUTION SYSTEM

(71) Applicant: Panasonic Intellectual Property Management Co., Ltd., Osaka (JP)

(72) Inventors: Takahiro Yamaguchi, Osaka (JP); Yoshiichiro Kashiwagi, Kyoto (JP); Yoshihiro Mori, Osaka (JP); Masayuki Kozuka, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 14/606,516

(22) Filed: Jan. 27, 2015

(65) Prior Publication Data
US 2015/0143445 A1    May 21, 2015

Related U.S. Application Data

(63) Continuation of application No. 13/819,840, filed as application No. PCT/JP2011/006982 on Dec. 14, 2011, now Pat. No. 8,977,099.

(60) Provisional application No. 61/423,742, filed on Dec. 16, 2010.

(51) Int. Cl.
| | |
|---|---|
| *H04N 5/932* | (2006.01) |
| *H04N 21/432* | (2011.01) |
| *H04N 11/20* | (2006.01) |
| *H04N 19/186* | (2014.01) |
| *H04N 19/40* | (2014.01) |

(Continued)

(52) U.S. Cl.
CPC .............. *H04N 21/4325* (2013.01); *G06T 7/00* (2013.01); *G06T 7/408* (2013.01); *G06T 11/001* (2013.01); *H04N 11/20* (2013.01); *H04N 19/00315* (2013.01); *H04N 19/00472* (2013.01); *H04N 19/136* (2014.11); *H04N 19/186* (2014.11);

(Continued)

(58) Field of Classification Search
None
See application file for complete search history.

(56) References Cited

U.S. PATENT DOCUMENTS

| | | | | |
|---|---|---|---|---|
| 8,977,099 | B2 * | 3/2015 | Yamaguchi et al. | 386/216 |
| 2003/0048238 | A1 * | 3/2003 | Tsuge et al. | 345/55 |

(Continued)

FOREIGN PATENT DOCUMENTS

| | | |
|---|---|---|
| JP | 2001-320682 | 11/2001 |
| JP | 2004-15226 | 1/2004 |
| JP | 2009-38825 | 2/2009 |

OTHER PUBLICATIONS

International Search Report issued Jan. 31, 2012 in corresponding International Application No. PCT/JP2011/006982.

*Primary Examiner* — Williams C Vaughn, Jr.
*Assistant Examiner* — Eileen Adams
(74) *Attorney, Agent, or Firm* — Wenderoth, Lind & Ponack, L.L.P.

(57) ABSTRACT

Provided is a production apparatus that can produce a distribution content that offers an even richer color tone expression during playback of video. The production apparatus for producing a distribution content including distribution video data is constituted by an original acquisition unit that acquires original video data; a distribution video acquisition unit that acquires the distribution video data, the distribution video data having been generated by conversion of the original video data to a lower gradation; a difference generation unit that generates difference data between the original video data and the distribution video data; and an output unit that outputs the difference data. A playback apparatus plays back the distribution content.

8 Claims, 31 Drawing Sheets

(51) Int. Cl.
*H04N 19/136* (2014.01)
*H04N 19/44* (2014.01)
*G06T 7/00* (2006.01)
*G06T 7/40* (2006.01)
*G06T 11/00* (2006.01)
*H04N 21/2383* (2011.01)
*H04N 21/438* (2011.01)
*H04N 21/2343* (2011.01)

(52) U.S. Cl.
CPC .............. *H04N 19/40* (2014.11); *H04N 19/44* (2014.11); *H04N 21/2383* (2013.01); *H04N 21/4382* (2013.01); *H04N 21/234327* (2013.01)

(56) References Cited

U.S. PATENT DOCUMENTS

| | | |
|---|---|---|
| 2003/0103668 A1 | 6/2003 | Kondo et al. |
| 2004/0125219 A1* | 7/2004 | Shibata et al. ........... 348/231.99 |
| 2007/0274676 A1 | 11/2007 | Diomelli et al. |
| 2008/0031599 A1 | 2/2008 | Ikeda et al. |
| 2008/0240599 A1 | 10/2008 | Kondo et al. |
| 2009/0208099 A1* | 8/2009 | Yoshii et al. ................... 382/167 |
| 2010/0046912 A1 | 2/2010 | Ikeda et al. |
| 2011/0064374 A1 | 3/2011 | Ikeda et al. |
| 2011/0064382 A1 | 3/2011 | Ikeda et al. |

* cited by examiner

FIG. 9

Shift amount data　　　　D20a

| Attribute | Value |
|---|---|
| Shift amount | 2 |

Shift amount data　　　　D20

| Frame number | Shift amount |
|---|---|
| 1 | 2 |
| 2 | 4 |
| ⋮ | ⋮ |
| L | 0 |

153 — 1 — 154
155 — 2 — 156
157 — L — 158

PRODUCTION APPARATUS AND CONTENT DISTRIBUTION SYSTEM

This application is a Continuation Application of application Ser. No. 13/819,840, which is the National Stage of International Application No. PCT/JP2011/006982, filed Dec. 14, 2011, which claims the benefit of U.S. Provisional Application No. 61/423,742, filed Dec. 16, 2010.

TECHNICAL FIELD

The present invention relates to technology for producing distribution content including distribution video data.

BACKGROUND ART

Recording media, such as optical discs, on which video, music, or other such content is recorded have become widespread, as have playback apparatuses that play back the content recorded on recording media, thus allowing for viewing of content in a home environment.

Patent Literature 1 discloses synchronous application technology that, when a plurality of digital streams recorded on separate recording media are played back, specifies synchronization of the digital streams, thereby causing the user to perceive the digital streams as though one movie were being played back. This technology allows for digital streams constituting a movie to be provided to the user on separate supply media, thus creating a variety of variations for playback.

CITATION LIST

Patent Literature

Patent Literature 1: Japanese Patent Application Publication No. 2009-38825

SUMMARY OF INVENTION

Technical Problem

While the technology in Patent Literature 1 provides one method for creating a variety of variations for playback of one movie, there is a demand for a variety of technology for playback of content in order to achieve the further popularization of content, most notably movies.

To meet this demand, it is an object of the present invention to provide a production apparatus, a production method, a computer program, a recording medium, an integrated circuit, and a content distribution system that allow for production of distribution content that offers an even richer color tone expression during playback of video.

Solution to Problem

In order to solve the above problems, the present invention is a production apparatus for producing a distribution content including distribution video data, the production apparatus comprising: an original video acquisition unit configured to acquire original video data; a distribution video acquisition unit configured to acquire the distribution video data, the distribution video data having been generated by conversion of the original video data to a lower gradation; a difference generation unit configured to generate difference data between the original video data and the distribution video data; and an output unit configured to output the difference data.

Advantageous Effects of Invention

With this structure, data on the difference between the original video data and the distribution video data is generated and output. This structure thereby achieves the advantageous effect of allowing a playback apparatus to use the difference data in order to play back video with an improved color tone expression as compared to when only distribution content recorded on a recording medium is played back.

BRIEF DESCRIPTION OF DRAWINGS

FIG. 9 illustrates an example of the data structure of shift amount data D20a.

FIG. 10 illustrates an example of the data structure of shift amount data D20.

DESCRIPTION OF EMBODIMENTS

Figure 1:
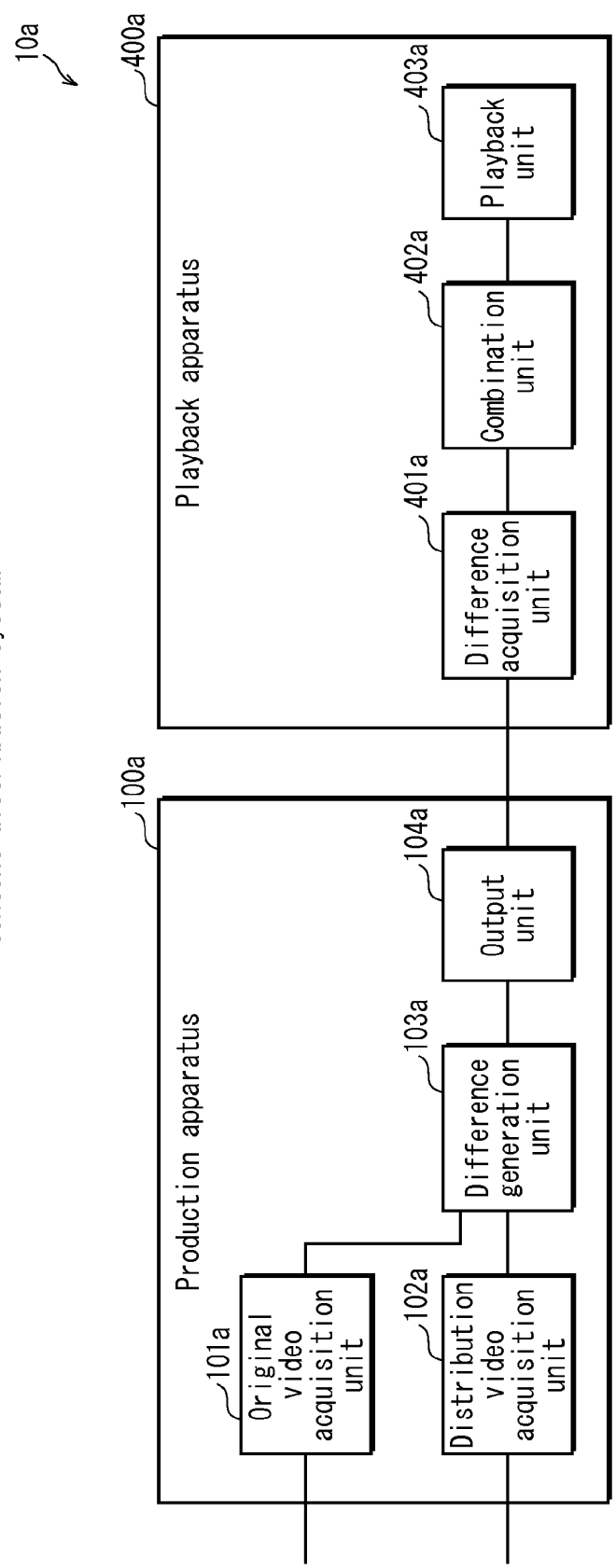
FIG. 1 illustrates the overall structure of a content distribution system 10a in Embodiment 1.

An aspect of the present invention is a production apparatus for producing a distribution content including distribution video data, the production apparatus comprising: an original video acquisition unit configured to acquire original video data; a distribution video acquisition unit configured to acquire the distribution video data, the distribution video data having been generated by conversion of the original video data to a lower gradation; a difference generation unit configured to generate difference data between the original video data and the distribution video data; and an output unit configured to output the difference data.

With this structure, data on the difference between the original video data and the distribution video data is generated and output. This structure thereby achieves the advantageous effect of allowing a playback apparatus to use the difference data in order to play back video with an improved color tone expression as compared to when only distribution content recorded on a recording medium is played back.

The original video data and the distribution video data may both include a plurality of frames, each frame including a plurality of pixels, each pixel including primary color data for each primary color. The difference generation unit may include a difference calculation unit configured to calculate a difference between primary color data in the original video data and primary color data in the distribution video data for each primary color of each pixel of each frame; and a reduction unit configured to reduce a bit length of the calculated difference. The difference data may include a plurality of frames, each frame including a plurality of pixels, each pixel including, for each primary color, the difference whose bit length is reduced.

With this structure, the bit length of the difference included in the difference data is reduced, thereby decreasing the volume of the difference data.

The difference generation unit may include a shift amount generation unit configured to generate a shift amount in accordance with a value of one or more most significant bits, other than a sign bit, in the difference calculated by the difference calculation unit. The reduction unit may reduce the bit length of the difference in accordance with the generated shift amount.

The value of the one or more significant bits other than the sign bit is often zero. Therefore, by reducing the bit length of the difference in accordance with the generated shift amount, this structure allows for effective reduction of the bit length of the difference without loss of valid values in the difference.

The shift amount generation unit may generate the shift amount in accordance with a count of consecutive zeros in the one or more most significant bits other than the sign bit.

With this structure, the shift amount is generated in accordance with the count of consecutive zeros, thus allowing for effective reduction of the bit length of the difference without loss of valid values in the difference.

The shift amount generation unit may generate one value for the shift amount for each frame.

This structure decreases the overall volume of the shift amount as compared to when the shift amount is generated for each pixel included in a frame.

The output unit may perform the output by writing the distribution content on a recording medium and writing the difference data and the shift amount on the recording medium in association with the distribution content.

With this structure, the distribution content, the difference data, and the shift data are recorded on the recording medium. Therefore, a playback apparatus can play back video with an improved color tone expression using only the distribution content, the difference data, and the shift amount recorded on the recording medium.

The output unit may perform the output by writing the distribution content on a recording medium and transmitting the difference data and the shift amount to a server apparatus in association with the distribution content.

With this structure, the distribution content is recorded on the recording medium, and the difference data and the shift data are transmitted to the server apparatus. Therefore, a playback apparatus can play back video with an improved color tone expression by reading the distribution content from the recording medium and receiving the difference data and the shift amount from the server apparatus.

Another aspect of the present invention is a production method used in a production apparatus for producing a distribution content including distribution video data, the production method comprising the steps of: acquiring original video data; acquiring the distribution video data, the distribution video data having been generated by conversion of the original video data to a lower gradation; generating difference data between the original video data and the distribution video data; and outputting the difference data.

With this method, data on the difference between the original video data and the distribution video data is generated and output. This structure thereby achieves the advantageous effect of allowing a playback apparatus to use the difference data in order to play back video with an improved color tone expression as compared to when only distribution content recorded on a recording medium is played back.

Another aspect of the present invention is a computer-readable recording medium having recorded thereon a computer program used in a production apparatus for producing a distribution content including distribution video data, the computer program causing a computer to perform the steps of: acquiring original video data; acquiring the distribution video data, the distribution video data having been generated by conversion of the original video data to a lower gradation;

generating difference data between the original video data and the distribution video data; and outputting the difference data.

By a computer executing the computer program recorded on the recording medium, data on the difference between the original video data and the distribution video data is generated and output. This structure thereby achieves the advantageous effect of allowing a playback apparatus to use the difference data in order to play back video with an improved color tone expression as compared to when only distribution content recorded on a recording medium is played back.

Another aspect of the present invention is a computer program used in a production apparatus for producing a distribution content including distribution video data, the computer program causing a computer to perform the steps of: acquiring original video data; acquiring the distribution video data, the distribution video data having been generated by conversion of the original video data to a lower gradation; generating difference data between the original video data and the distribution video data; and outputting the difference data.

By a computer executing the computer program, data on the difference between the original video data and the distribution video data is generated and output. This structure thereby achieves the advantageous effect of allowing a playback apparatus to use the difference data in order to play back video with an improved color tone expression as compared to when only distribution content recorded on a recording medium is played back.

Another aspect of the present invention is an integrated circuit constituting a production apparatus for producing a distribution content including distribution video data, the integrated circuit comprising: an original video acquisition unit configured to acquire original video data; a distribution video acquisition unit configured to acquire the distribution video data, the distribution video data having been generated by conversion of the original video data to a lower gradation; a difference generation unit configured to generate difference data between the original video data and the distribution video data; and an output unit configured to output the difference data.

With this structure, data on the difference between the original video data and the distribution video data is generated and output. This structure thereby achieves the advantageous effect of allowing a playback apparatus to use the difference data in order to play back video with an improved color tone expression as compared to when only distribution content recorded on a recording medium is played back.

Another aspect of the present invention is a content distribution system including a production apparatus and a playback apparatus, the production apparatus being for producing a distribution content including distribution video data, and the playback apparatus being for playing back the distribution content, the production apparatus comprising: an original video acquisition unit configured to acquire original video data; a distribution video acquisition unit configured to acquire the distribution video data, the distribution video data having been generated by conversion of the original video data to a lower gradation; a difference generation unit configured to generate difference data between the original video data and the distribution video data; and an output unit configured to output the difference data, the playback apparatus comprising: a difference acquisition unit configured to acquire the difference data; a combination unit configured to combine the distribution video data with the difference data so as to generate playback video data having a gradation equivalent to the original video data; and a playback unit configured to play back the generated playback video data.

With this structure, the production device generates and outputs data on the difference between the original video data and the distribution video data, and the playback apparatus combines the distribution video data and the difference data to generate the playback video data. This structure thereby achieves the advantageous effect of allowing for playback of video with an improved color tone expression as compared to when only distribution content recorded on a recording medium is played back.

The following describes embodiments of the present invention with reference to the drawings.

1. EMBODIMENT 1

The following describes a content distribution system $10a$ as an embodiment of the present invention.

(1) As illustrated in FIG. 1, the content distribution system $10a$ includes a production apparatus $100a$ and a playback apparatus $400a$. The production apparatus $100a$ produces a distribution content including distribution video data. The playback apparatus $400a$ plays back the distribution content.

As illustrated in FIG. 1, the production apparatus $100a$ includes an original video acquisition unit $101a$, a distribution video acquisition unit $102a$, a difference generation unit $103a$, and an output unit $104a$.

The video acquisition unit $101a$ acquires original video data. The distribution video acquisition unit $102a$ acquires the distribution video data, the distribution video data having been generated by conversion of the original video data to a lower gradation. The difference generation unit $103a$ generates difference data between the original video data and the distribution video data. The output unit $104a$ outputs the difference data.

The playback apparatus $400a$ includes a difference acquisition unit $401a$, a combination unit $402a$, and a playback unit $403a$.

The difference acquisition unit $401a$ acquires the difference data. The combination unit $402a$ combines the distribution video data with the difference data so as to generate playback video data having a gradation equivalent to the original video data. The playback unit $403a$ plays back the generated playback video data.

The following structure may also be adopted.

(2) The original video data and the distribution video data both include a plurality of frames, each frame including a plurality of pixels, each pixel including primary color data for each primary color.

The difference generation unit $103a$ includes a difference calculation unit $108a$ (not illustrated in the figures) that calculates a difference between primary color data in the original video data and primary color data in the distribution video data for each primary color of each pixel of each frame, and a reduction unit $110a$ (not illustrated in the figures) that reduces a bit length of the calculated difference.

The difference data includes a plurality of frames, each frame including a plurality of pixels, each pixel including, for each primary color, the difference whose bit length is reduced.

(3) The difference generation unit $103a$ further includes a shift amount generation unit $109a$ (not illustrated in the figures) that generates a shift amount in accordance with a value of one or more most significant bits, other than a sign bit, in the difference calculated by the difference calculation unit $108a$.

The reduction unit 110a reduces the bit length of the difference in accordance with the generated shift amount.

(4) The shift amount generation unit 109a generates the shift amount in accordance with a count of consecutive zeros in the one or more most significant bits other than the sign bit.

(5) The shift amount generation unit 109a generates one value for the shift amount for each frame.

(6) The output unit 104a performs the output by writing the distribution content on a recording medium and writing the difference data and the shift amount on the recording medium in association with the distribution content.

(7) The output unit 104a performs the output by writing the distribution content on a recording medium and transmitting the difference data and the shift amount to a server apparatus in association with the distribution content.

2. EMBODIMENT 2

The following describes a content distribution system 10 as another embodiment of the present invention.

2.1 Overall Structure of Content Distribution System 10

Figure 2:
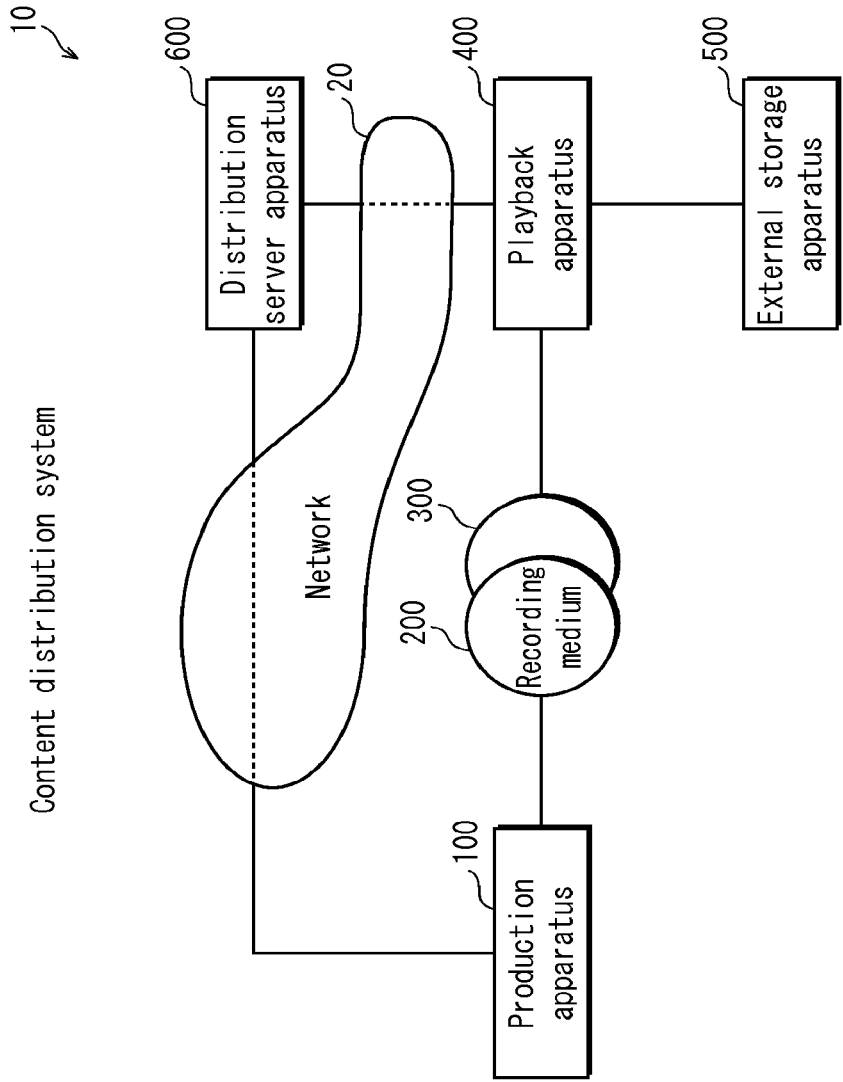
FIG. 2 illustrates the overall structure of a content distribution system 10 in Embodiment 2.

As illustrated in FIG. 2, the content distribution system 10 includes a production apparatus 100, a playback apparatus 400, an external storage apparatus 500, and a distribution server apparatus 600. The production apparatus 100 and the distribution server apparatus 600 are connected over a network 20. The distribution server apparatus 600 and the playback apparatus 400 are also connected over the network 20. A recording medium 200 and a recording medium 300 are mounted into the production apparatus 100, and the production apparatus 100 records a content onto the recording medium 200 and the recording medium 300. The recording medium 200 and the recording medium 300 with the content recorded thereon are mounted into the playback apparatus 400. The playback apparatus 400 is connected to the external storage apparatus 500.

Note that as an example, the producer of the recording medium 200 and the recording medium 300 owns the production apparatus 100, whereas the service provider to provide services related to the content owns the distribution server apparatus 600. This service provider provides a service to increase the gradation of the content recorded on the recording medium 300. The user of the content owns the playback apparatus 400 and the external storage apparatus 500.

Based on an original content that includes original video images produced by movie production company, the production apparatus 100 produces a distribution content that includes distribution video for recording on a recording medium and records the produced distribution content on the recording medium. Therefore, the original content produced by the movie production company is not distributed on the market as is, but rather the recording medium on which the distribution content is recorded is distributed on the market.

The original video produced by the movie production company is composed of plurality of frames. Each frame is composed of a plurality of pixels arranged in a matrix, and each pixel has primary color data for each primary color R, G, and B. Each piece of primary color data is, for example, 12 bits long, and each primary color is represented by 4096 gradations. In other words, each primary color has a 12-bit color depth.

Like the original video, the distribution video recorded on the recording medium is composed of plurality of frames. Each frame is composed of a plurality of pixels arranged in a matrix, and each pixel has primary color data for each primary color R, G, and B. Each piece of primary color data is, for example, eight bits long, and each primary color is represented by 256 gradations. In other words, each primary color has an 8-bit color depth.

Each primary color in the original video produced by the movie production company is thus represented by 4096 gradations. By contrast, each primary color in the distribution video recorded on the recording medium is represented by 256 gradations. This is due to a restriction on the capacity of data recordable on the recording medium. For example, the data length of each piece of primary color data in the distribution video recorded on the recording medium is stipulated as being eight bits.

To avoid confusion in the following explanation, the following reference signs are used for the constituent elements of the production apparatus 100 and the playback apparatus 400, and for the data that is the target of processing.

Original video D1, first converted video D2, compressed video D3, decompressed video D4, shifted decompressed video D5, second converted video D6, difference data D7, fixed gradation difference data D8, compressed difference data D9, shifted video D10, shifted difference data D11, composite video D12, shifted combined video D13, shift amount data D20, and recording medium ID (D21).

2.2 Structure of Production Apparatus 100

Figure 3:
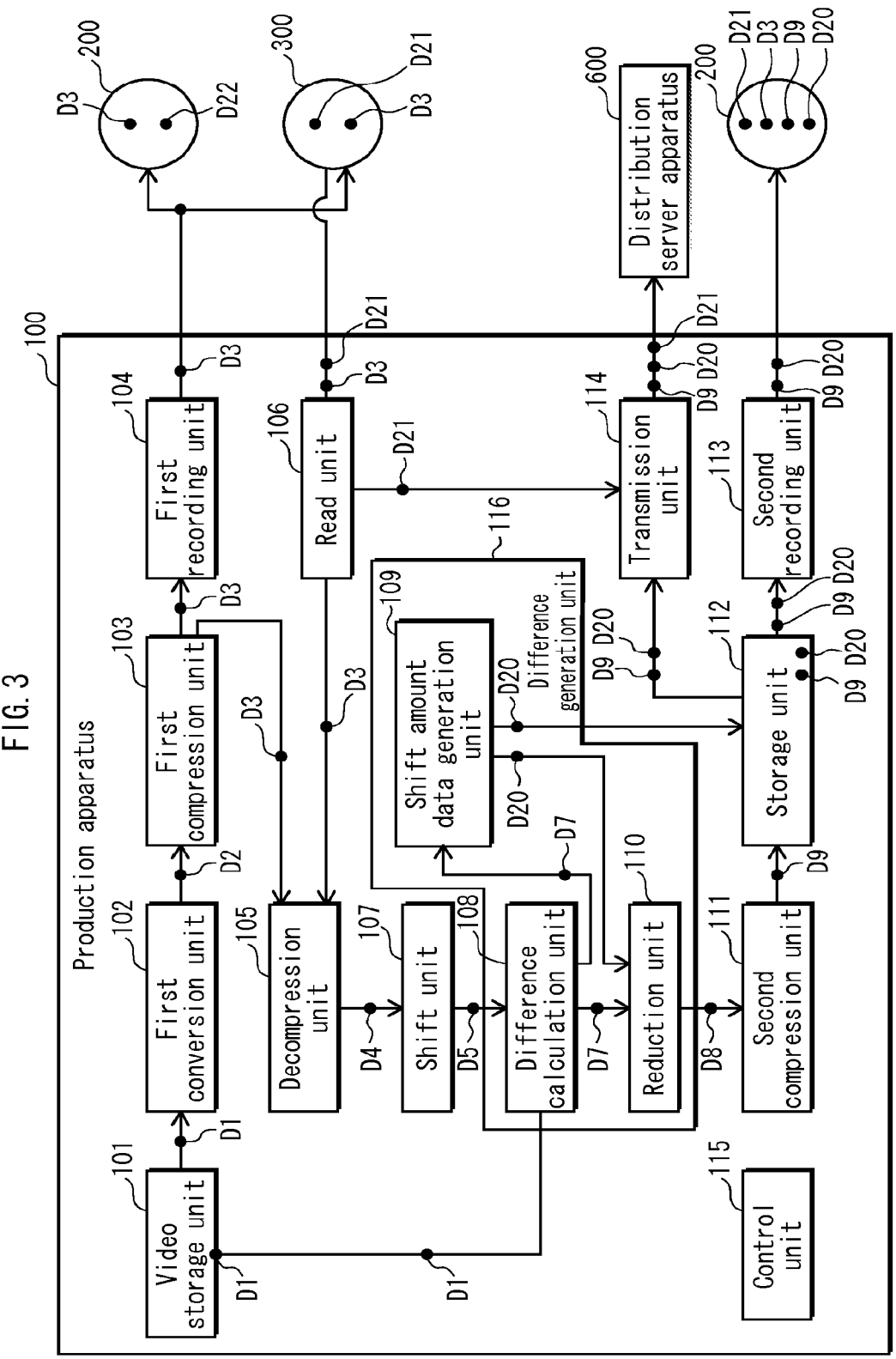
FIG. 3 is a block diagram illustrating the structure of a production apparatus 100.

FIG. 3 illustrates the structure of the production apparatus 100.

As illustrated in FIG. 3, the production apparatus 100 includes a video storage unit 101, a first conversion unit 102, a first compression unit 103, a first recording unit 104, a decompression unit 105, a read unit 106, a shift unit 107, a difference calculation unit 108, a shift amount data generation unit 109, a reduction unit 110, a second compression unit 111, a storage unit 112, a second recording unit 113, a transmission unit 114, and a control unit 115. The difference calculation unit 108, the shift amount data generation unit 109, and the reduction unit 110 constitute a difference generation unit 116.

Specifically, the production apparatus 100 is a computer system composed of a microprocessor, ROM, RAM, a hard disk unit, and the like. The RAM or the hard disk unit stores a computer program. By the microprocessor operating in accordance with the computer program, the first conversion unit 102, the first compression unit 103, the first recording unit 104, the decompression unit 105, the read unit 106, the shift unit 107, the difference calculation unit 108, the shift amount data generation unit 109, the reduction unit 110, the second compression unit 111, the second recording unit 113, the transmission unit 114, the control unit 115, and the difference generation unit 116 in the production apparatus 100 fulfill their functions.

As described above, the production apparatus 100 produces a distribution content that includes distribution video based on original content, which includes original video, and records the produced distribution content on a recording medium. Each content includes video, audio data, subtitles, secondary audio data, audio commentary, control information, and the like. The following explanation mainly relates to video, and an explanation of other information included in the content is omitted.

(1) Video Storage Unit 101

The video storage unit 101 is, for example, composed of a hard disk unit.

The video storage unit 101 stores original video D1 composed of a plurality of frames. The original video D1 is the actual video produced by the movie production company. Moving video is represented by the plurality of frames composing the original video D1 being played back continuously in time.

Figure 4:
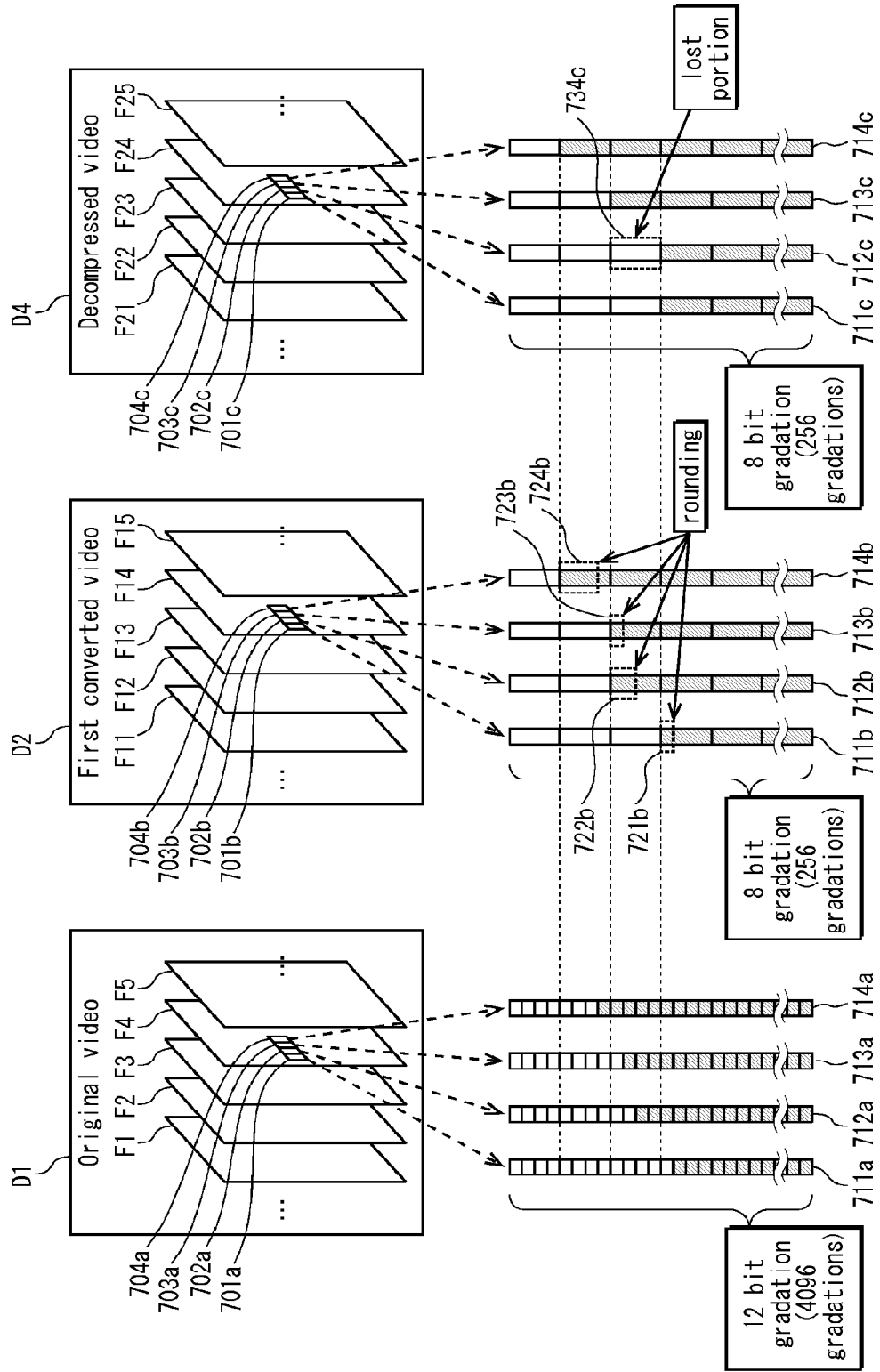
FIG. 4 illustrates an example of the data structure of original video D1, first converted video D2, and decompressed video D4.

As illustrated in FIG. 4, one example of the original video D1 includes five frames: F1, F2, F3, F4, and F5. In each frame, a plurality of pixels are arranged in a matrix. Each pixel has 12-bit primary color data for each primary color R, G, and B. Accordingly, each primary color is represented by 4096 gradations.

As illustrated in FIG. 4, one primary color 701*a* (R, G, or B) for one pixel in frame F4 is represented by 4096 gradations. Other primary colors 702*a*, 703*a*, and 704*a* for other pixels in the frame F4 are also represented by 4096 gradations.

In FIG. 4, the gradation of the primary color 701*a* is visually represented as a gradation representation 711*a*. In the gradation representation 711*a*, 4096 cells form a vertical line. Each cell represents one gradation, and the number of cells hatched with diagonal lines represents the gradation of the primary color 701*a*. Like the primary color 701*a*, the gradations of the primary colors 702*a*, 703*a*, and 704*a* are represented by the number of hatched cells in gradation representations 712*a*, 713*a*, and 714*a*.

(2) Storage Unit 112

The storage unit 112 is, for example, composed of a hard disk unit.

The storage unit 112 is provided with a region for storing the compressed difference data D9 and the shift amount data D20.

(3) First Conversion Unit 102

As illustrated below, the first conversion unit 102 converts the original video D1 by lowering the gradation of the video, thus generating the first converted video D2.

The first conversion unit 102 reads the original video D1 from the video storage unit 101 and applies a first conversion to the primary color data of each primary color of each pixel in each frame of the read original video D1.

An example of the first conversion is an algorithm that converts the 12-bit primary color data in the original video D1 to 8-bit primary color data. In other words, through the first conversion, primary colors represented by 4096 gradations are converted into primary colors represented by 256 gradations. For example, the first conversion is to round the 12-bit primary color data (for example, by rounding upwards) in order to generate 8-bit primary color data.

The first conversion unit 102 thus applies the first conversion to each piece of primary color data in the original video D1 to generate the first converted video D2. The first converted video D2 is composed of plurality of frames. Each frame is composed of a plurality of pixels arranged in a matrix, and each pixel has primary color data for each primary color R, G, and B. Each piece of primary color data is eight bits long, and each primary color is represented by 256 gradations.

As described above, the 12-bit color depth in the original video D1 is used during production of a movie by the movie production company, whereas the 8-bit color depth is stipulated for the recording medium. The first conversion is necessary in order to convert the original video produced by the movie production company into video with a color depth stipulated for the recording medium, so that the video can be recorded on the recording medium.

As illustrated in FIG. 4, an example of the first converted video D2 generated in this way includes frames F11, F12, F13, F14, and F15 corresponding to the frames F1, F2, F3, F4, and F5 of the original video D1. In each frame included in the first converted video D2, a plurality of pixels are arranged in a matrix. Each pixel has 8-bit primary color data for each primary color R, G, and B. Accordingly, each primary color is represented by 256 gradations.

As illustrated in FIG. 4, one primary color 701*b* (R, G, or B) for one pixel in frame F14 is represented by 256 gradations. Other primary colors 702*b*, 703*b*, and 704*b* for other pixels in the frame F14 are also represented by 256 gradations.

In FIG. 4, the gradation of the primary color 701*b* is visually represented as a gradation representation 711*b*. In the gradation representation 711*b*, 256 cells form a vertical line. Each cell represents one gradation, and the number of cells hatched with diagonal lines represents the gradation of the primary color 701*b*. Like the primary color 701*b*, the gradations of the primary colors 702*b*, 703*b*, and 704*b* are represented by the number of hatched cells in gradation representations 712*b*, 713*b*, and 714*b*.

The primary color data in the first converted video D2 illustrated in FIG. 4 is generated by converting the 12-bit primary color data of the original video D1 to 8-bit data. Therefore, when rounding from 12 bits to eight bits, a portion of the information in each piece of primary color data of the original video D1 is lost. In the gradation representations 711*b*, 712*b*, 713*b*, and 714*b* illustrated in FIG. 4, the locations where information is lost are indicated by reference signs 721*b*, 722*b*, 723*b*, and 724*b*.

The first conversion unit 102 outputs the generated first converted video D2 to the first compression unit 103.

(4) First Compression Unit 103

The first compression unit 103 receives the first converted video D2 from the first conversion unit 102 and applies a video compression algorithm to the received first converted video D2, thereby generating the compressed video D3. Video compression algorithms are well known, and therefore a description thereof is omitted. Next, the first compression unit 103 outputs the generated compressed video D3 to the first recording unit 104. The first compression unit 103 also outputs the generated compressed video D3 to the decompression unit 105.

The compression algorithm includes, for example, a quantization encoding process. Loss of information occurs during this process. The compressed video D3 is composed of a plurality of codes generated by the compression algorithm, and color depth cannot be represented directly by the compressed video D3. To illustrate the information lost by compression, FIG. 4 shows the decompressed video D4 obtained by decompressing the compressed video D3.

The decompressed video D4 illustrated in FIG. 4 includes frames F21, F22, F23, F24, and F25 corresponding to the frames F11, F12, F13, F14, and F15 of the first converted video D2. In each frame included in the decompressed video D4, a plurality of pixels are arranged in a matrix. Each pixel has 8-bit primary color data for each primary color R, G, and B. Accordingly, each primary color is represented by 256 gradations.

As illustrated in FIG. 4, one primary color 701*c* (R, G, or B) for one pixel in frame F24 is represented by 256 gradations. Other primary colors 702*c*, 703*c*, and 704*c* for other pixels in the frame F24 are also represented by 256 gradations.

In FIG. 4, like the primary color 701*b* and the like, the gradations of the primary colors 701*c*, 702*c*, 703*c*, and 704*c* are represented by the number of hatched cells in gradation representations 711*c*, 712*c*, 713*c*, and 714*c*.

In FIG. 4, the portion of information that is lost due to the effect of compression (quantization encoding) is indicated by 734c.

(5) First Recording Unit 104

The first recording unit 104 receives the compressed video D3 from the first compression unit 103 and writes the received compressed video D3 on the recording medium 200 and the recording medium 300.

(6) Decompression Unit 105

The decompression unit 105 receives the compressed video D3 from the first compression unit 103 or receives the compressed video D3 from the read unit 106. The decompression unit 105 applies a video decompression algorithm to the compressed video D3 received from either source, thus generating the decompressed video D4. Video decompression algorithms are well known, and therefore a description thereof is omitted. Next, the decompression unit 105 outputs the generated decompressed video D4 to the shift unit 107.

Figure 5:
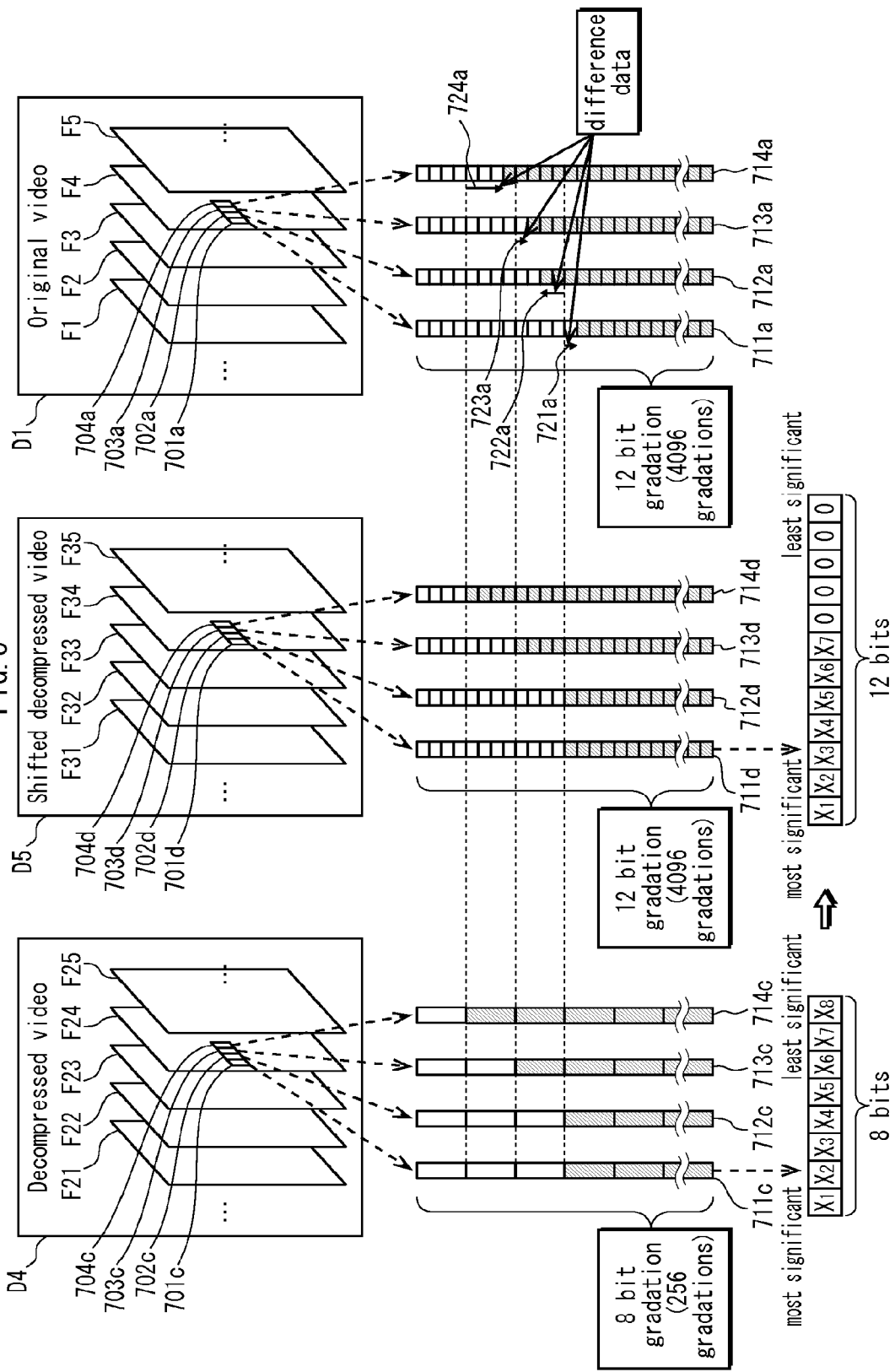
FIG. 5 illustrates an example of the data structure of decompressed video D4, shifted decompressed video D5, and original video D1.

FIG. 5 illustrates an example of the decompressed video D4. Note that the example of the decompressed video D4 illustrated in FIG. 5 is the same as the example of the decompressed video D4 illustrated in FIG. 4.

(7) Shift Unit 107

The shift unit 107 receives the decompressed video D4 from the decompression unit 105. Next, the shift unit 107 shifts the bits of the primary color data of each pixel included in each frame in the received decompressed video D4 in the direction of the most significant bit, so as to match the color depth of the original video D1 stored in the video storage unit 101. The shift unit 107 thus generates the shifted decompressed video D5 and outputs the generated shifted decompressed video D5 to the difference calculation unit 108.

Here, the primary color data of each pixel included in each frame of the original video D1 is 12 bits, and the primary color data of each pixel included in each frame of the decompressed video D4 is eight bits. Therefore, the shift unit 107 shifts the primary color data of each pixel included in each frame of the decompressed video D4 by four bits in the direction of the most significant bit. The least significant four bits are filled with "0x0000". Here, the numbers after "0x" are represented in binary.

As in the example illustrated in FIG. 5, the shifted decompressed video D5 is composed of the same number of frames as the number of frames included in the decompressed video D4 and includes frames F31, F32, F33, F34, and F35 corresponding to the frames F21, F22, F23, F24, and F25 of the decompressed video D4. In each frame, a plurality of pixels are arranged in a matrix. Each pixel has 12-bit primary color data for each primary color R, G, and B. Accordingly, each primary color is represented by 4096 gradations. As illustrated in FIG. 5, one primary color 701d (R, G, or B) for one pixel in frame F34 is represented by 4096 gradations. Other primary colors 702d, 703d, and 704d for other pixels in the frame F34 are also represented by 4096 gradations.

In FIG. 5, like the primary color 701c, the gradations of the primary colors 701d, 702d, 703d, and 704d are represented by the number of hatched cells in gradation representations 711d, 712d, 713d, and 714d.

In this way, although each primary color in the decompressed video D4 was represented by 256 gradations, the primary colors are now represented by 4096 gradations due to each piece of primary color data being shifted four bits in the direction of the most significant bit.

Note that the shift amount may be the same for every piece of compressed video D3 stored on the recording medium 200 and the recording medium 300. Alternatively, the shift amount may vary for each logical playback unit (a PlayList in the case of BLU-RAY DISC (registered trademark)) in the recording medium 200 and the recording medium 300. Furthermore, the shift amount may vary for each unit of compressed video D3 (a Clip in the case of BLU-RAY DISC (registered trademark)).

(8) Difference Calculation Unit 108

The difference calculation unit 108 reads the original video D1 from the video storage unit 101 and receives the shifted decompressed video D5 from the shift unit 107.

Next, the difference calculation unit 108 calculates the difference between each piece of primary color data of each pixel included in each frame of the read original video D1 with the corresponding piece of primary color data of each pixel included in each frame of the received shifted decompressed video D5, thereby generating the difference data D7 that includes the calculated differences. The difference data D7 includes the same number of frames as the number of frames included in the original video D1. Each frame includes a plurality of pixels, and each pixel includes the difference calculated for the primary color.

In the original video D1 illustrated in FIG. 5, differences 721a, 722a, 723a, and 724a between the original video D1 and the shifted decompressed video D5 are represented.

Figure 6:
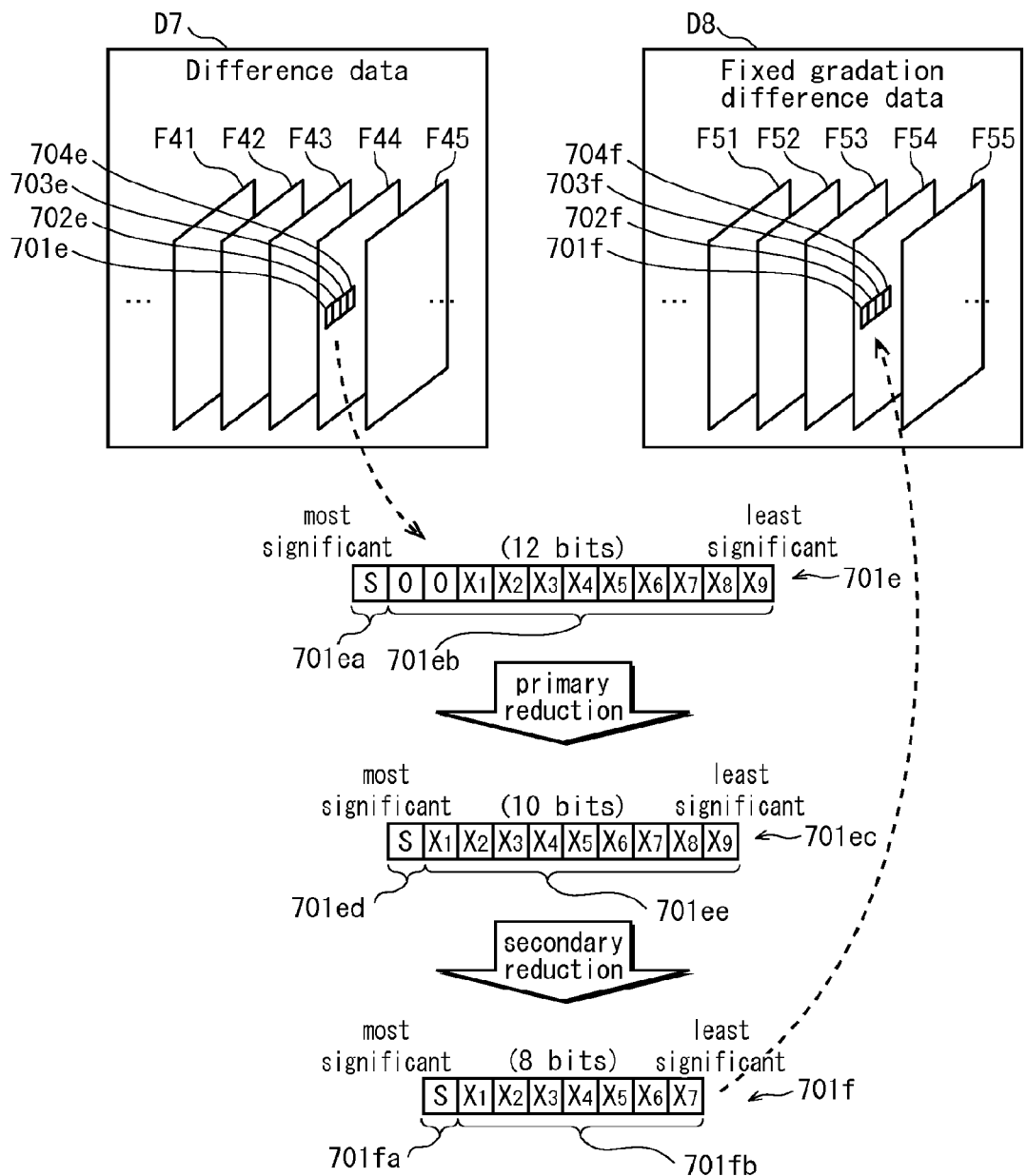
FIG. 6 illustrates an example of the data structure of difference data D7 and fixed gradation difference data D8.

FIG. 6 illustrates an example of the difference data D7 obtained from the difference calculation unit 108. As illustrated in FIG. 6, the difference data D7 includes frames F41, F42, F43, F44, and F45 corresponding to the frames F1, F2, F3, F4, and F5 included in the original video D1. In each frame, a plurality of pixels are arranged in a matrix. Each pixel has a 12-bit difference for each primary color R, G, and B.

As illustrated in FIG. 6, the frame F44 has a difference 701e for one primary color in one pixel and has differences 702e, 703e, and 704e for primary colors in other pixels. The difference 701e is 12 bits long. The most significant bit 701ea of the difference 701e is a sign bit. When the most significant bit 701ea is "0x0", the difference 701e has a positive value, and when the most significant bit 701ea is "0x1", the difference 701e has a negative value. Within the difference 701e, the bit sequence 701eb containing bits other than the most significant bit 701ea indicates the absolute value of the number represented by the difference 701e.

The difference calculation unit 108 outputs the difference data D7 to the shift amount data generation unit 109 and the reduction unit 110.

(9) Shift Amount Data Generation Unit 109

The shift amount data generation unit 109 receives the difference data D7 from the difference calculation unit 108.

Next, the shift amount data generation unit 109 determines the shift amount P as follows for each frame included in the difference data D7.

(i) The shift amount data generation unit 109 tentatively sets the shift amount P to be four bits for the frame.

Then, for the difference in primary colors of each pixel in the frame, the shift amount data generation unit 109 operates as follows:

(ii) the shift amount data generation unit 109 sets the shift amount P to four bits when the four bits after the most significant (sign) bit within the 12-bit difference are "0x0000", (iii) sets the shift amount P to two bits when the two bits after the most significant (sign) bit within the 12-bit difference are "0x00", and either or both of the third and fourth bits are "0x1", and (iv) sets the shift amount P to zero bits when either or both of the two bits after the most significant (sign) bit within the 12-bit difference are "0x1".

Within one frame, the shift amount P is determined as described above in the order (iv), (iii), (ii).

In other words, in one frame, if the shift amount P is determined to be zero bits for any difference, the shift amount P is zero bits for the frame.

If the shift amount P is not determined to be zero bits for any difference in a frame, then if the shift amount P is determined to be two bits for any difference, the shift amount P is two bits for the frame.

If the shift amount P is not determined to be zero bits for any difference in a frame, and if the shift amount P is not determined to be two bits for any difference, then the shift amount P is four bits for the frame.

In one frame, only one shift amount P is determined.

The shift amount data generation unit 109 generates the shift amount data D20 including the shift amount P determined in this way, outputs the generated shift amount data D20 to the reduction unit 110, and writes the generated shift amount data D20 in the storage unit 112.

FIG. 10 illustrates an example of the shift amount data D20. As illustrated in FIG. 10, the shift amount data D20 includes frame numbers, uniquely identifying frames, in one-to-one correspondence with shift amounts P. In other words, the shift amount data D20 includes a plurality of pairs of a frame number and a shift amount P. The first pair is composed of a frame number 153 "1" and a shift amount 156 "2". The second pair is composed of a frame number 155 "2" and a shift amount 156 "4". The $L^{th}$ pair is composed of a frame number 157 "L" and a shift amount 158 "0". The first pair indicates that the shift amount P is set to "2" for the frame identified by the frame number "1". The second pair indicates that the shift amount P is set to "4" for the frame identified by the frame number "2". The $L^{th}$ pair indicates that the shift amount P is set to "0" for the frame identified by the frame number "L".

Alternatively, the shift amount data generation unit 109 may generate shift amount data including a plurality of pairs composed of a compression video number, uniquely identifying a compressed video, and a shift amount P. In this case, only one shift amount exists for one compressed video.

FIG. 9 illustrates shift amount data D20a as another example of the shift amount data D20. As illustrated in FIG. 9, the shift amount data D20a includes an attribute 151 "shift amount" in correspondence with a value 152 "2". This indicates that the value 152 "2" is a shift amount. The shift amount data D20 illustrated in FIG. 9 indicates that the shift amount is fixed for a certain video unit. This may be implemented by adding "attribute: shift amount" and "value: 2" to a control file recorded on the recording medium 200 and the recording medium 300. For example, adding this information to the management file of a BLU-RAY DISC (registered trademark) allows for specification of the shift amount of the compressed difference data D9 within the BLU-RAY DISC (registered trademark).

The shift amount data D20 and D20a do not need to be recorded on the recording medium 200 separately from the compressed video D3, but rather may be embedded in the compressed video D3.

Figure 11:
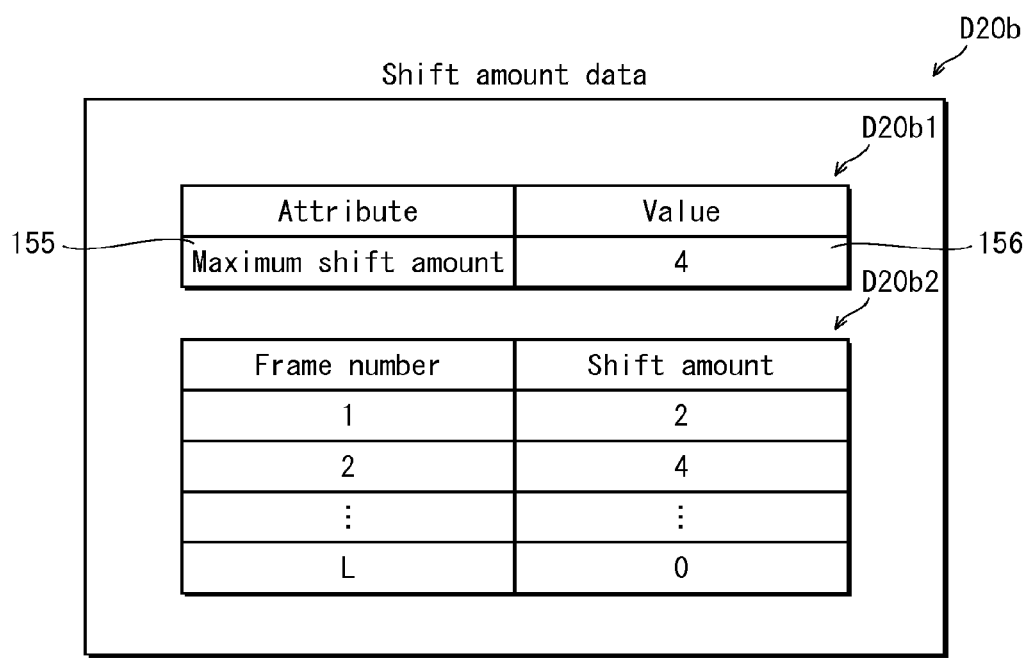
FIG. 11 illustrates an example of the data structure of shift amount data D20b.

As illustrated by the example in FIG. 11, the shift amount data generation unit 109 may generate shift amount data D20b that includes data D20b1 and data D20b2. The data D20b2 is the same as the shift amount data D20 illustrated in FIG. 10. The data D20b1 includes an attribute 155 "maximum shift amount" and a value 156 "4". Here, the maximum shift amount indicates the largest among shift amounts included in the data D20b2, and the value thereof is "4". The largest actual shift amount in the data D20b2 is "4".

Embedding the shift amount data D20b in, for example, a management file related to the recording medium 200 and the recording medium 300 allows for the playback apparatus 400 to be informed of the maximum value of the number of shifted bits when using the compressed difference data D9 recorded on the recording medium 200 and the recording medium 300. Apart from a management file related to the recording medium 200 and the recording medium 300, this information may be specified for any unit, such as a logical playback unit of the compressed video D3 (a PlayList or the like in the case of BLU-RAY DISC (registered trademark)), or in units of the compressed video D3.

(10) Reduction Unit 110

The reduction unit 110 performs a primary reduction process and a secondary reduction process, as indicated below, to remove superfluous bits from the difference data D7 and generate the fixed gradation difference data D8, which has a fixed gradation that can be processed by the system. In the case of BLU-RAY DISC (registered trademark), compressed video has 8-bit gradation, and most system LSIs for BLU-RAY DISC (registered trademark) are optimized for decoding of 8-bit gradation video. Therefore, setting the fixed gradation difference data D8 to have 8-bit gradation increases affinity with an LSI implementation.

The reduction unit 110 receives the shift amount data D20 from the shift amount data generation unit 109. The reduction unit 110 also receives the difference data D7 from the difference calculation unit 108.

Next, for each frame included in the difference data D7, the reduction unit 110 extracts the shift amount P corresponding to the frame from the shift amount data D20.

Next, for each frame included in the difference data D7, the reduction unit 110 performs the primary reduction process and secondary reduction process on the difference in primary colors of each pixel in the frame, thereby generating the fixed gradation difference data D8.

(a) Primary Reduction Process

The reduction unit 110 removes a bit sequence from the difference starting from the most significant bit other than the sign bit. The length of the removed bit sequence is the shift amount P. If the shift amount P is zero, the difference is maintained as is. As a result, a primary reduction difference is generated.

(b) Secondary Reduction Process

The reduction unit 110 ensures that the bit length of the primary reduction difference is "8" in order to generate a fixed gradation difference.

The reduction unit 110 determines whether the bit length of the primary reduction difference generated by the primary reduction process is "8".

If the bit length of the primary reduction difference is "8", the reduction unit 110 maintains the primary reduction difference as is, setting the primary reduction difference to be the fixed gradation difference.

If the bit length of the primary reduction difference is not "8", the reduction unit 110 removes the least significant bits of the primary reduction difference so that the bit length of the primary reduction difference becomes "8". For example, if the bit length of the primary reduction difference is "10", the reduction unit 110 removes the two least significant bits of the primary reduction difference. The reduction unit 110 thus generates the fixed gradation difference by removing the least significant bits from the primary reduction difference.

Accordingly, the sign bit included in the primary reduction difference remains as the sign bit in the uppermost significant bit of the fixed gradation difference. The secondary reduction process thus ends.

The reduction unit 110 thus generates the fixed gradation difference data D8.

Here, the fixed gradation difference data D8 is composed of the same number of frames as the number of frames included in the difference data D7. In the example illustrated in FIG. 6, the fixed gradation difference data D8 includes frames F51, F52, F53, F54, and F55 corresponding to the frames F41, F42, F43, F44, and F45 of the difference data D7. In each frame, a plurality of pixels are arranged in a matrix. Each pixel has an 8-bit fixed gradation difference for each primary color R, G, and B.

Next, the reduction unit 110 outputs the generated fixed gradation difference data D8 to the second compression unit 111.

Figure 7:
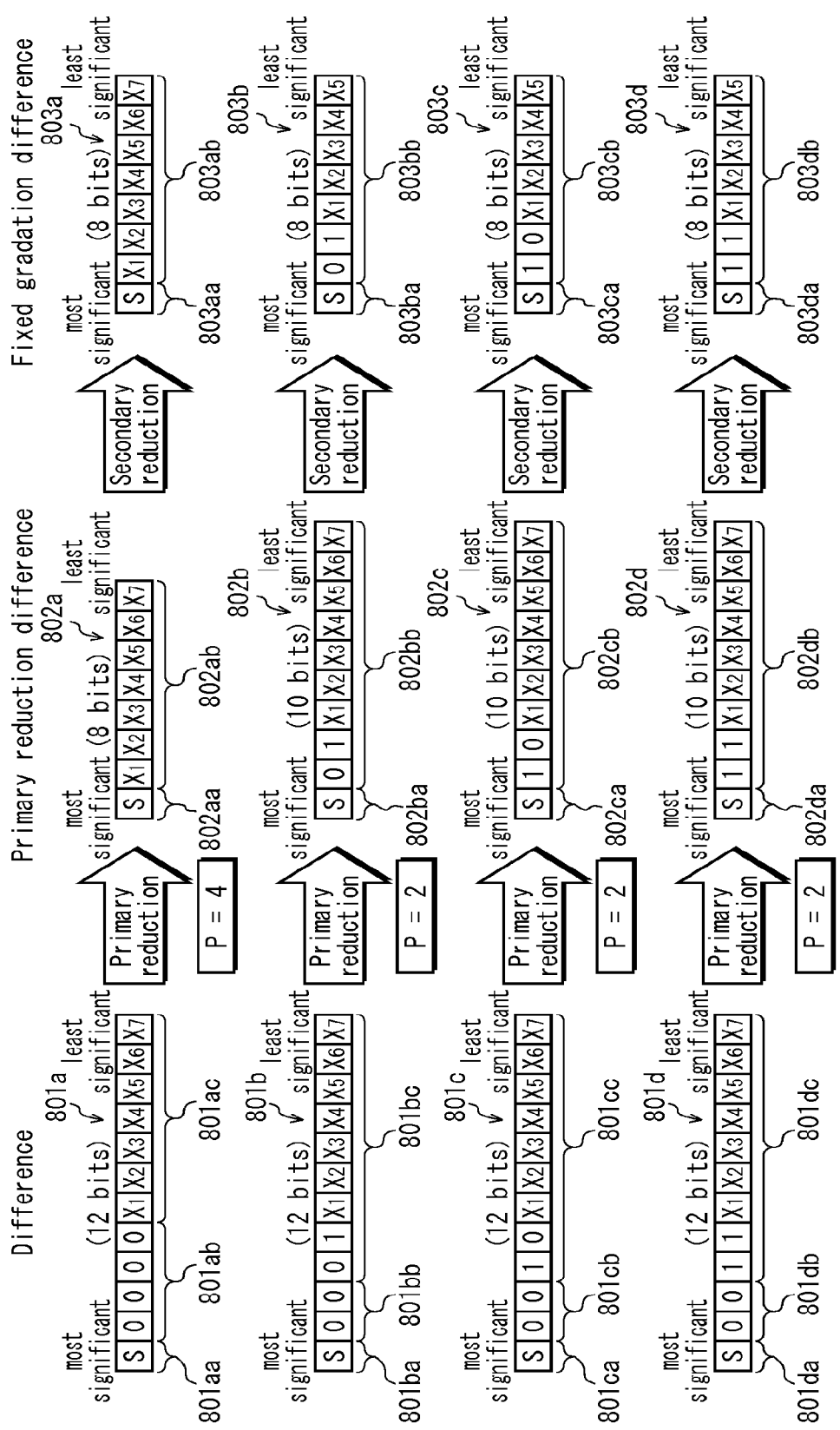
FIG. 7 illustrates an example of a difference, a primary reduction difference, and a fixed gradation difference.
Figure 8:
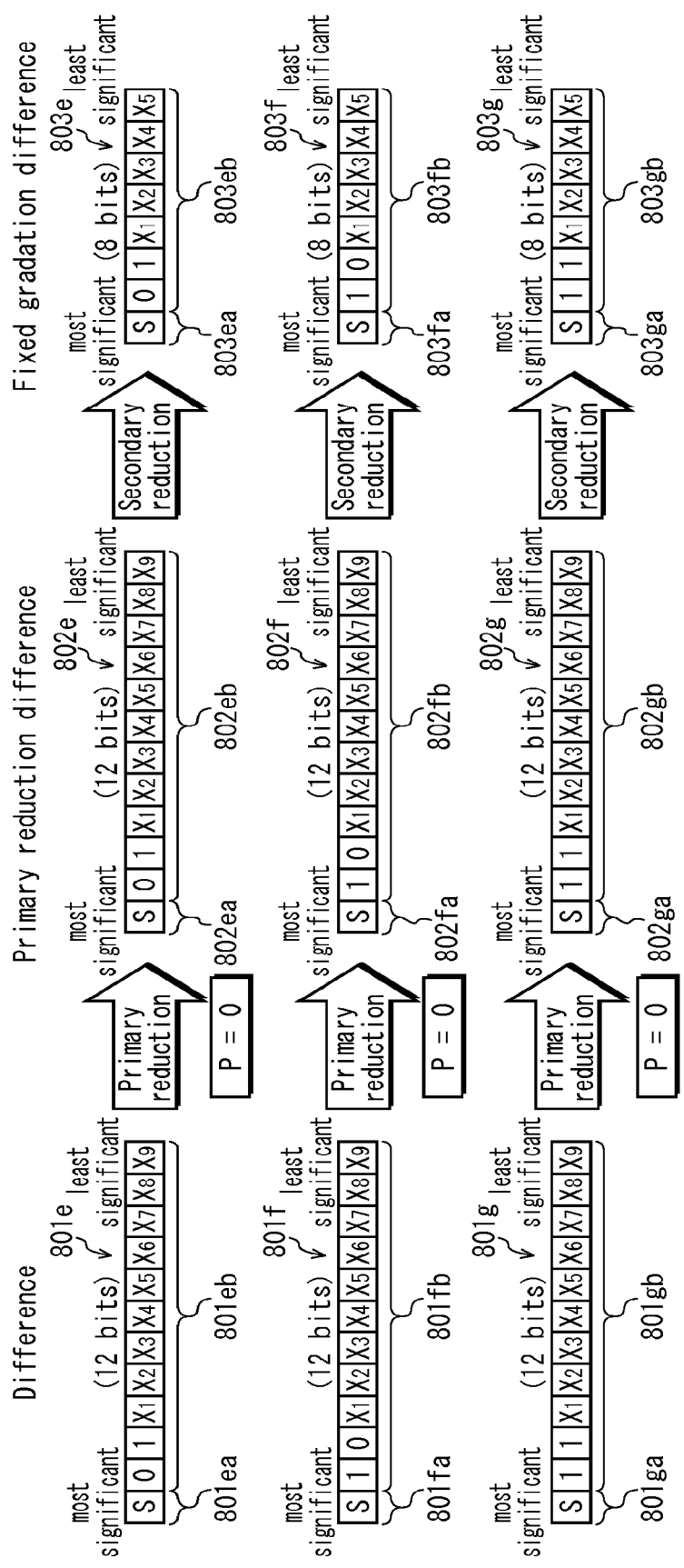
FIG. 8 illustrates another example of a difference, a primary reduction difference, and a fixed gradation difference.

Here, the primary reduction difference generated by the reduction unit 110 is described using the examples illustrated in FIGS. 7 and 8.

(i) When the shift amount P is zero, the reduction unit 110 does not remove the difference in primary colors of each pixel in each frame of the difference data D7.

Since the shift amount P is zero, the reduction unit 110 does not remove the differences 801e, 801f, or 801g, but rather generates primary reduction differences 802e, 802f, and 802g identical to the differences 801e, 801f, and 801g, as illustrated by the example in FIG. 8. Here, either or both of the two bits in the differences 801e, 801f, and 801g after the respective most significant (sign) bits 801ea, 801fa, and 801ga are "0x1".

(ii) When the shift amount P is two, the reduction unit 110 removes two bits from the difference in primary colors of each pixel in each frame of the difference data D7.

Since the shift amount P is two, the reduction unit 110 removes the two bits "0x00" after the most significant (sign) bit in the differences 801b, 801c, and 801d, generating primary reduction differences 802b, 802c, and 802d as illustrated by the example in FIG. 7. Here, the two bits in the differences 801b, 801c, and 801d after the respective most significant (sign) bits 801ba, 801ca, and 801da are "0x00", and either or both of the third and fourth bits are "0x1".

(iii) When the shift amount P is four, the reduction unit 110 removes four bits from the difference in primary colors of each pixel in each frame of the difference data D7.

Since the shift amount P is four, the reduction unit 110 removes the four bits "0x0000" after the most significant (sign) bit in the difference 801a, generating a primary reduction difference 802a as illustrated by the example in FIG. 7. Here, the four bits after the most significant bit 801aa in the difference 801a are "0x0000".

The fixed gradation difference generated by the reduction unit 110 is described using the examples illustrated in FIGS. 7 and 8.

As illustrated by the example in FIG. 7, the primary reduction difference 802a has a bit length of "8", and therefore the primary reduction difference 802a is maintained as is as the fixed gradation difference 803a.

The primary reduction differences 802b, 802c, and 802d each have a bit length of "10", and therefore the bit sequences that remain after removal of the least significant two bits become the fixed gradation differences 803b, 803c, and 803d.

As illustrated by the example in FIG. 8, the primary reduction differences 802e, 802f, and 802g each have a bit length of 12, and therefore the bit sequences that remain after removal of the least significant four bits become the fixed gradation differences 803e, 803f, and 803g.

(11) Second Compression Unit 111

The second compression unit 111 receives the fixed gradation difference data D8 from the reduction unit 110 and applies a compression algorithm to the received fixed gradation difference data D8, thereby generating the compressed difference data D9.

The compression algorithm is the same as the compression algorithm used by the first compression unit 103.

The second compression unit 111 writes the generated compressed difference data D9 in the storage unit 112.

(12) Second Recording Unit 113

The second recording unit 113 reads the compressed difference data D9 and the shift amount data D20 from the storage unit 112 and writes the read compressed difference data D9 and shift amount data D20 on the recording medium 200.

(13) Read Unit 106

The read unit 106 reads the compressed video D3 from the recording medium 300 and outputs the read compressed video D3 to the decompression unit 105. The read unit 106 also reads the recording medium ID (D21) from the recording medium 300 and outputs the read recording medium ID (D21) to the transmission unit 114.

(14) Transmission Unit 114

The transmission unit 114 reads the compressed difference data D9 and the shift amount data D20 from the storage unit 112 and transmits the read compressed difference data D9 and the shift amount data D20 to the distribution server apparatus 600. The transmission unit 114 also receives the recording medium ID (D21) from the read unit 106 and transmits the received recording medium ID (D21) to the distribution server apparatus 600.

(15) Control Unit 115

The control unit 115 controls operations of all of the constituent elements constituting the production apparatus 100.

2.3 Process of Producing a Recording Medium in the Production Apparatus 100

Figure 12:
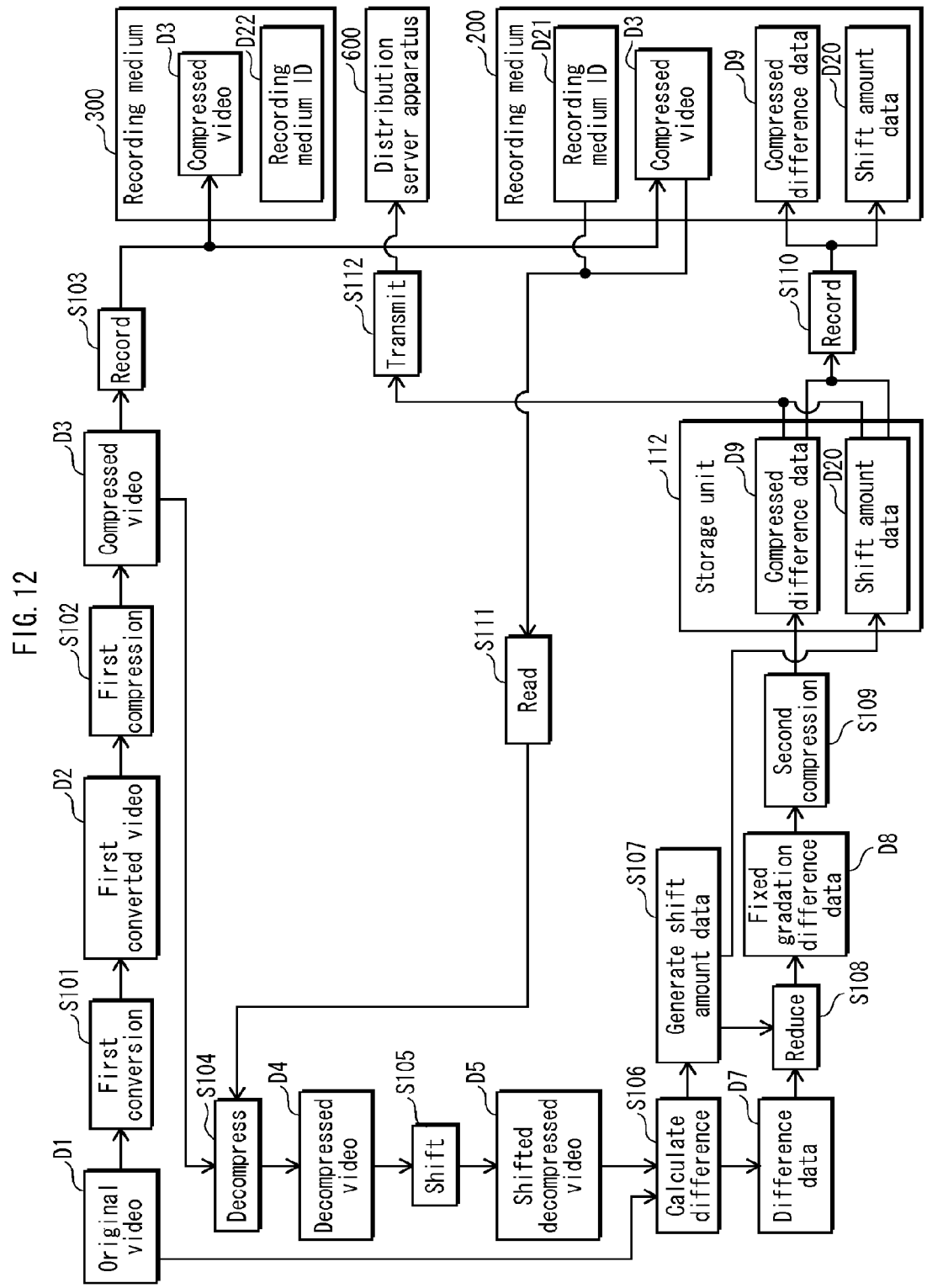
FIG. 12 illustrates a process of producing a recording medium in the production apparatus 100.

With reference to FIG. 12, the following describes the process of producing a recording medium in the production apparatus 100.

The first conversion unit 102 reads the original video D1 from the video storage unit 101, applies the first conversion to generate the first converted video D2, and outputs the first converted video D2 to the first compression unit 103 (step S101).

The first compression unit 103 applies a compression algorithm to the first converted video D2 received from the first conversion unit 102, thereby generating the compressed video D3. The first compression unit 103 then outputs the generated compressed video D3 to the decompression unit 105 and the first recording unit 104 (step S102).

The first recording unit 104 receives the compressed video D3 from the first compression unit 103 and writes the received compressed video D3 on the recording medium 200 and the recording medium 300 (step S103).

The decompression unit 105 receives the compressed video D3 from the first compression unit 103 or from the read unit 106, applies the decompression algorithm to the received compressed video D3, thereby generating the decompressed video D4, and outputs the generated decompressed video D4 to the shift unit 107 (step S104).

The shift unit 107 shifts the bits of the primary color data of each pixel included in each frame in the decompressed video D4 received from the decompression unit 105, thereby generating the shifted decompressed video D5, and outputs the generated shifted decompressed video D5 to the difference calculation unit 108 (step S105).

The difference calculation unit 108 calculates the difference between the primary color data of each pixel included in each frame of the original video D1 and the corresponding piece of primary color data of each pixel included in each frame of the shifted decompressed video D5, thereby generating the difference data D7 that includes the calculated differences. The difference calculation unit 108 then outputs the generated difference data D7 to the shift amount data generation unit 109 and the reduction unit 110 (step S106).

The shift amount data generation unit 109 generates the shift amount data D20 from the difference data D7, outputs the generated shift amount data D20 to the reduction unit 110, and writes the generated shift amount data in the storage unit 112 (step S107).

The reduction unit 110 generates the fixed gradation difference data D8 from the difference data D7 and outputs the generated fixed gradation difference data D8 to the second compression unit 111 (step S108).

The second compression unit 111 applies a compression algorithm to the fixed gradation difference data D8 received from the reduction unit 110, thereby generating the compressed difference data D9, and outputs the generated compressed difference data D9 to the storage unit 112 (step S109).

The second recording unit 113 writes the compressed difference data D9 and the shift amount data D20 read from the storage unit 112 on the recording medium 200 (step S110).

The read unit 106 outputs the compressed video D3 read from the recording medium 300 to the decompression unit 105 (step S111).

The transmission unit 114 transmits the compressed difference data D9 and the shift amount data D20 read from the storage unit 112 to the distribution server apparatus 600 (step S112).

2.4 Data Structure of Recording Medium 200

Figure 13:
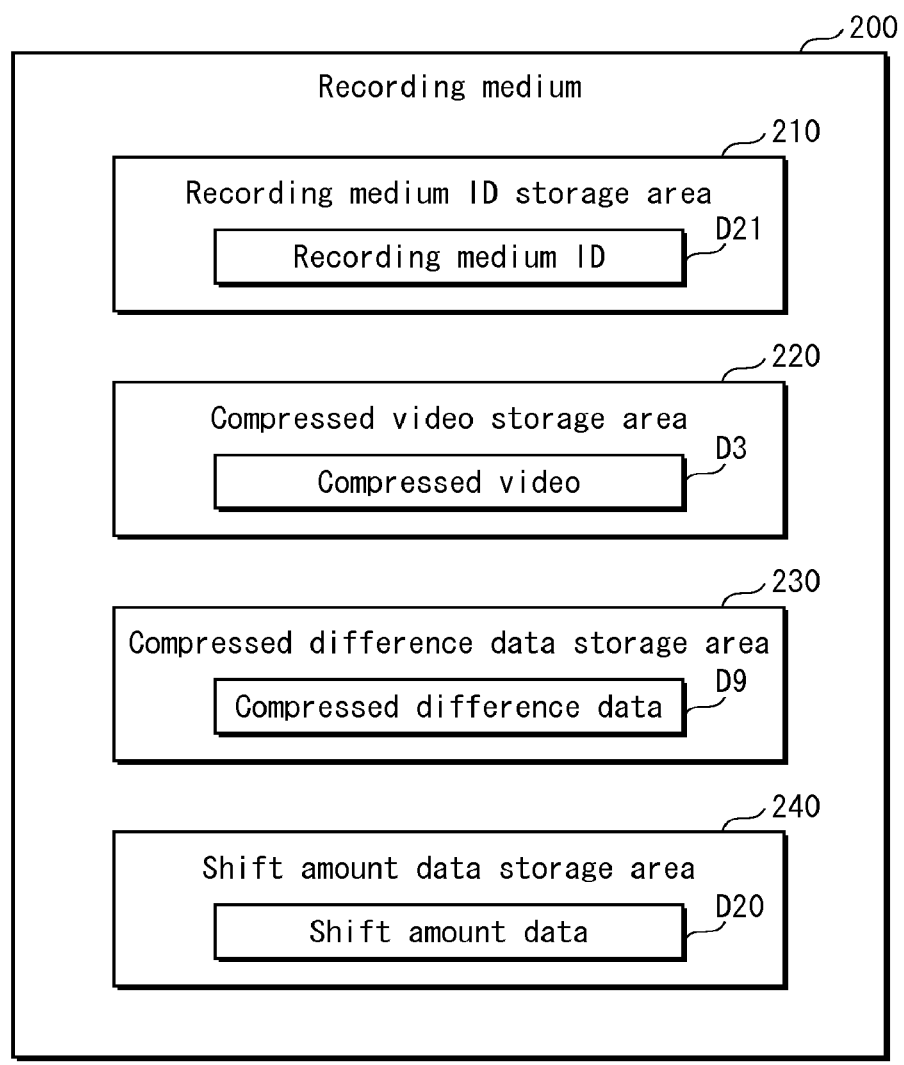
FIG. 13 illustrates the data structure of a recording medium 200.

FIG. 13 illustrates the data structure of the recording medium 200.

As illustrated in FIG. 13, the recording medium 200 includes a recording medium ID storage area 210, a compressed video storage area 220, a compressed difference data storage area 230, and a shift amount data storage area 240.

The recording medium ID storage area 210 is an area for storing the recording medium ID (D21). In the case of BLU-RAY DISC (registered trademark), an example of information that may be used as the ID that identifies a recording medium is the Content Certificate ID, which is one area of the AACS Content Certificate File recorded in the AACS directory.

The compressed video storage area 220 is an area for storing the compressed video D3. In the case of BLU-RAY DISC (registered trademark), an M2TS file is stored in the STREAM directory below the BDMV directory, and this M2TS file is an example of the compressed video D3.

The compressed difference data storage area 230 is an area for storing the compressed difference data D9.

The shift amount data storage area 240 is an area for storing the shift amount data D20.

2.5 Data Structure of Recording Medium 300

Figure 14:
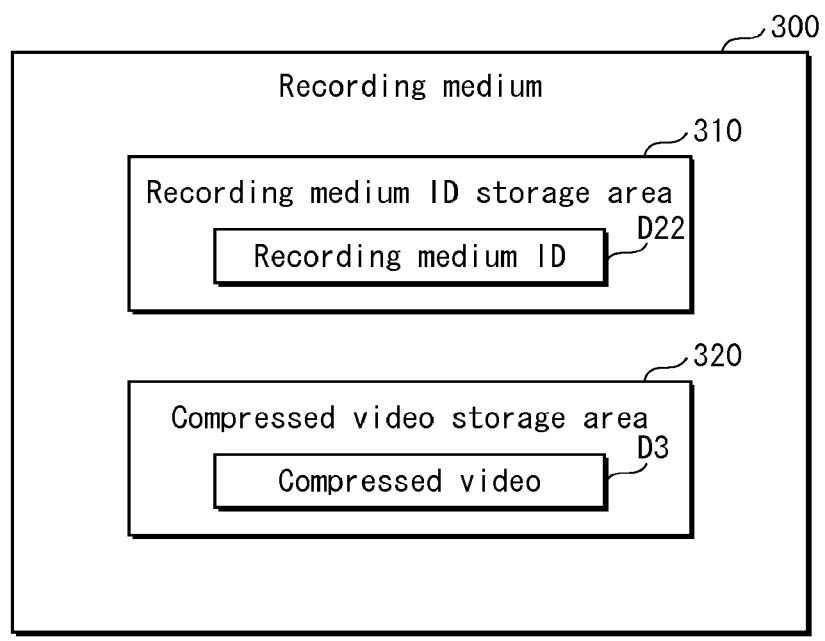
FIG. 14 illustrates the data structure of a recording medium 300.

FIG. 14 illustrates the data structure of the recording medium 300.

As illustrated in FIG. 14, the recording medium 300 includes a recording medium ID storage area 310 and a compressed video storage area 320.

Note that the recording medium 300 does not have the compressed difference data D9 nor the shift amount data D20 recorded thereon.

The recording medium ID storage area 310 is an area for storing the recording medium ID (D22). In the case of BLU-RAY DISC (registered trademark), an example of information that may be used as the ID that identifies the recording medium 300 is the Content Certificate ID, which is one area of the AACS Content Certificate File recorded in the AACS directory.

The compressed video storage area 320 is an area for storing the compressed video D3. In the case of BLU-RAY DISC (registered trademark), an M2TS file is stored in the STREAM directory below the BDMV directory, and this M2TS file is an example of the compressed video D3.

2.6 Structure of Playback Apparatus 400

The playback apparatus 400 plays back a distribution content recorded on a recording medium.

Figure 15:
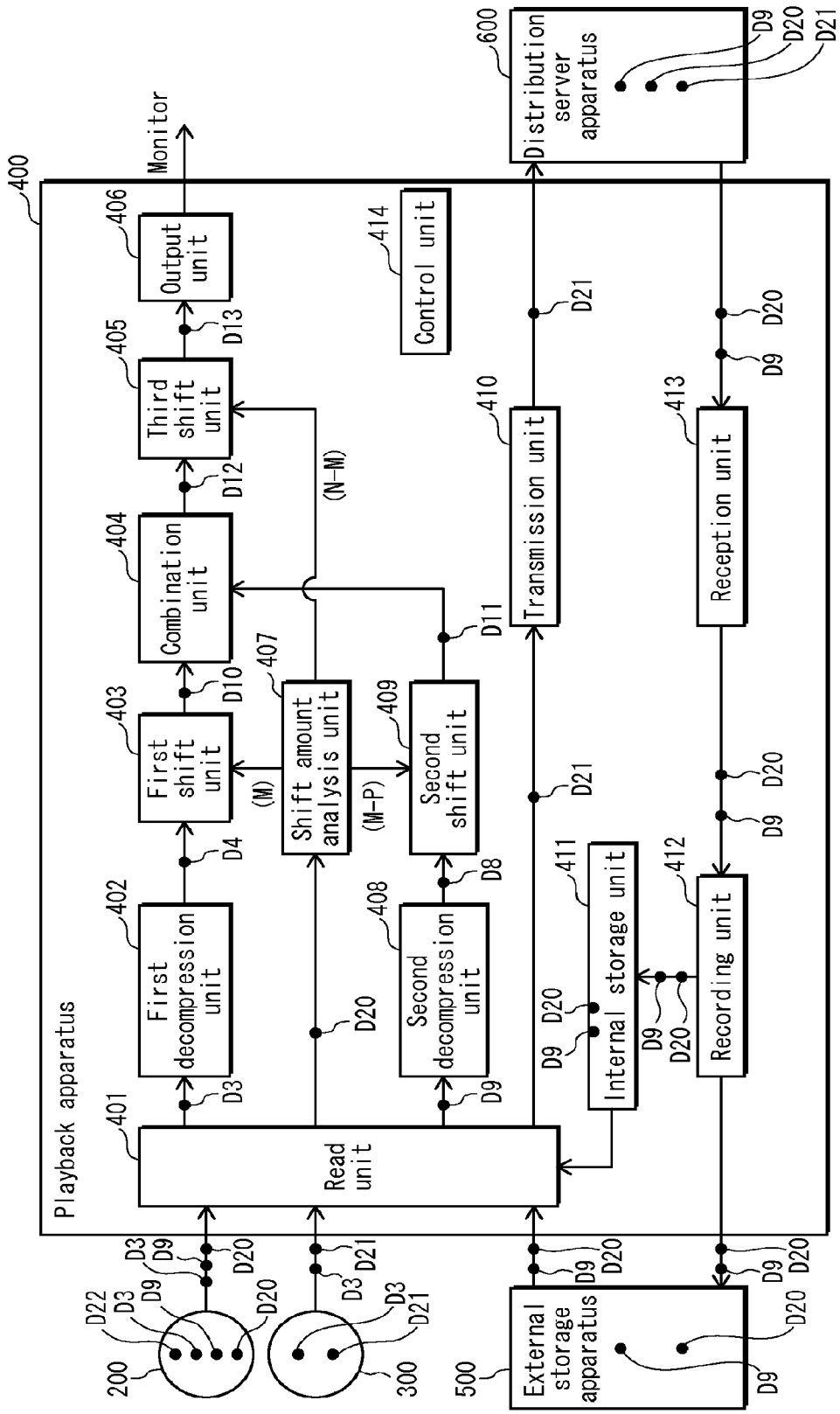
FIG. 15 is a block diagram illustrating the structure of a playback apparatus 400.

FIG. 15 illustrates the structure of the playback apparatus 400.

As illustrated in FIG. 15, the playback apparatus 400 includes a read unit 401, a first decompression unit 402, a first shift unit 403, a combination unit 404, a third shift unit 405, an output unit 406, a shift amount analysis unit 407, a second decompression unit 408, a second shift unit 409, a transmission unit 410, an internal storage unit 411, a recording unit 412, a reception unit 413, and a control unit 414.

Specifically, the playback apparatus 400 is a computer system composed of a microprocessor, ROM, RAM, a hard disk unit, and the like. The RAM or the hard disk unit stores a computer program. By the microprocessor operating in accordance with the computer program, the read unit 401, the first decompression unit 402, the first shift unit 403, the combination unit 404, the third shift unit 405, the output unit 406, the shift amount analysis unit 407, the second decompression unit 408, the second shift unit 409, the transmission unit 410, the recording unit 412, the reception unit 413, and the control unit 414 in the playback apparatus 400 fulfill their functions.

(1) Internal Storage Unit 411

The internal storage unit 411 is, for example, composed of a hard disk unit.

The internal storage unit 411 is provided with a region for storing the compressed difference data D9 and the shift amount data D20.

(2) Read Unit 401

The read unit 401 reads the compressed video D3, the compressed difference data D9, and the shift amount data D20 from the recording medium 200, outputs the read compressed video D3 to the first decompression unit 402, outputs the read compressed difference data D9 to the second decompression unit 408, and outputs the read shift amount data D20 to the shift amount analysis unit 407.

The read unit 401 also reads the compressed video D3 and the recording medium ID (D21) from the recording medium 300, outputs the read compressed video D3 to the first decompression unit 402, and outputs the read recording medium ID (D21) to the transmission unit 410.

Furthermore, the read unit 401 reads the compressed difference data D9 and the shift amount data D20 from one of the external storage apparatus 500 and the internal storage unit 411, outputs the read compressed difference data D9 to the second decompression unit 408, and outputs the read shift amount data D20 to the shift amount analysis unit 407.

(3) Second Decompression Unit 408

The second decompression unit 408 decompresses the compressed difference data D9 received from the read unit 401, thereby generating the fixed gradation difference data D8, and outputs the generated fixed gradation difference data D8 to the second shift unit 409.

Figure 17:
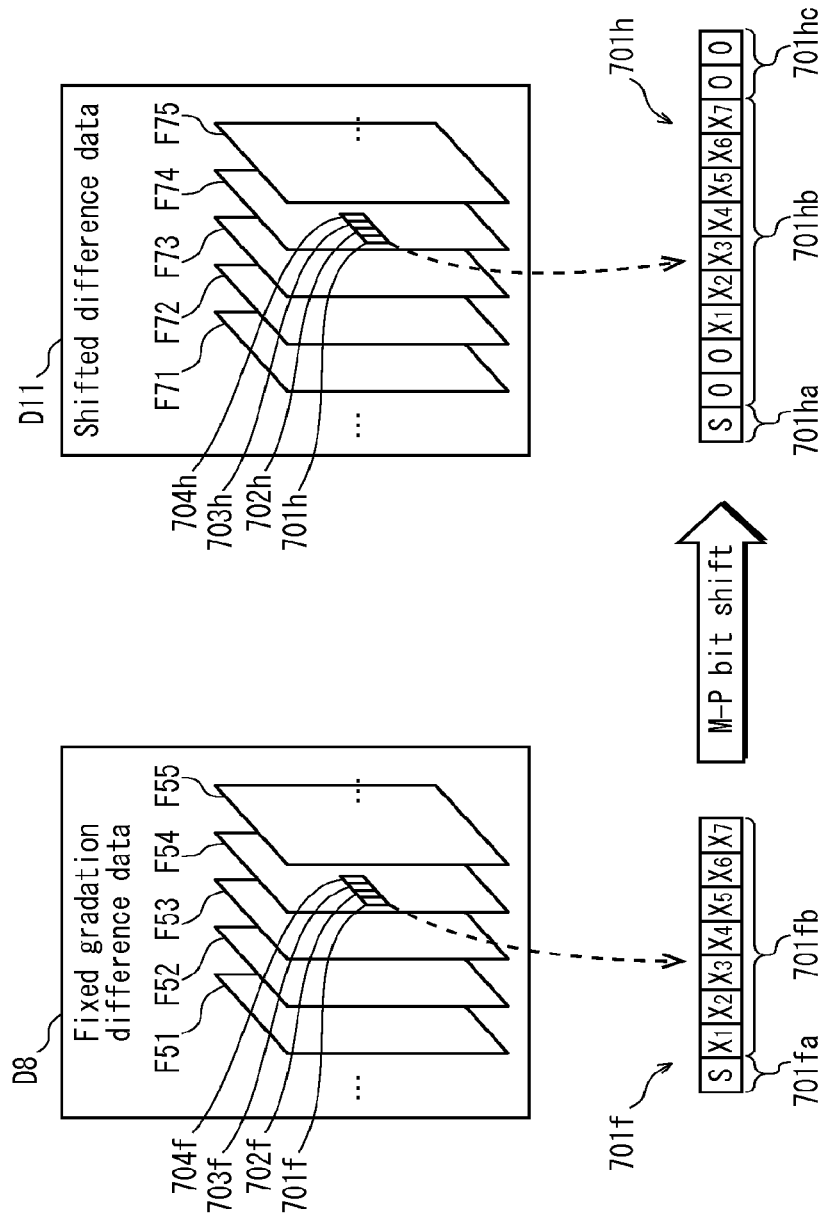
FIG. 17 illustrates an example of the data structure of the fixed gradation difference data D8 and of shifted difference data D11.

FIG. 17 illustrates an example of the fixed gradation difference data D8.

(4) Shift Amount Analysis Unit 407

The shift amount analysis unit 407 pre-stores an offset shift amount N. The offset shift amount N is a value determined by the apparatus that receives the output of the playback apparatus 400 and represents the bit length of each piece of primary color data of pixels in the video as required by the apparatus that receives the output when this apparatus processes video.

The shift amount analysis unit 407 reads the offset shift amount N.

The shift amount analysis unit 407 receives the shift amount data D20 from the read unit 401. Upon receiving the shift amount data D20, the shift amount analysis unit 407 analyzes the received shift amount data D20.

As illustrated in FIG. 9, when the received shift amount data D20 includes an attribute 151 "shift amount", the shift amount analysis unit 407 reads the value 152 "2" from the shift amount data D20 as the shift amount P.

As illustrated in FIG. 10, when the received shift amount data D20 includes a plurality of pairs of a frame number and a shift amount, the shift amount analysis unit 407 reads each pair of frame number and shift amount from the shift amount data D20. The read shift amount is set to be the shift amount P.

When the received shift amount data D20 includes a plurality of pairs of a compression video number and a shift amount (not shown in the figures), the shift amount analysis unit 407 reads each pair of compression video number and shift amount from the shift amount data D20. The read shift amount is set to be the shift amount P.

As illustrated in FIG. 11, when the received shift amount data D20 is the shift amount data D20b, the shift amount analysis unit 407 reads the value 156 "4" from the shift amount data D20b as the maximum shift amount. The shift amount analysis unit 407 also reads a plurality of pairs D20b2 of a frame number and a shift amount. The read shift amount is set to be the shift amount P.

When the received shift amount data D20 is the shift amount data D20b illustrated in FIG. 11, the maximum shift amount read from the shift amount data D20b is set to be an offset shift amount M.

When the received shift amount data D20 is the shift amount data D20 illustrated in FIG. 10, the shift amount analysis unit 407 extracts the largest shift amount from the shift amount data D20, sets the extracted largest shift amount to be the maximum shift amount, and sets this maximum shift amount to be the offset shift amount M.

When the received shift amount data is of the type illustrated in FIG. 9, the shift amount analysis unit 407 confirms the shift amount for each pixel in units such as frames, GOPs, scenes, or the like in the video, extracts the largest shift amount therein, and sets the extracted largest shift amount to be the offset shift amount M.

The shift amount analysis unit 407 outputs the offset shift amount M to the first shift unit 403 and instructs the first shift unit 403 to perform a bit shift. The shift amount analysis unit 407 also outputs a shift amount (M−P) to the second shift unit 409 and instructs the second shift unit 409 to perform a bit shift. Furthermore, the shift amount analysis unit 407 outputs a shift amount (N−M) to the third shift unit 405 and instructs the third shift unit 405 to perform a bit shift.

(5) Second Shift Unit 409

The second shift unit 409 receives the shift instruction and the shift amount (M−P) from the shift amount analysis unit 407. The second shift unit 409 also receives the fixed gradation difference data D8 from the second decompression unit 408.

The second shift unit 409 generates the shifted difference data D11 by shifting the bits in each piece of primary color data of each pixel in each frame of the fixed gradation difference data D8 received from the second decompression unit 408 by the shift amount indicated by the shift amount analysis unit 407.

As illustrated by the example in FIG. 17, the fixed gradation difference data D8 includes frames F51, F52, F53, F54, and F55, and in each frame, a plurality of pixels are arranged in a matrix. Each pixel has an 8-bit fixed gradation difference for each primary color R, G, and B. Frame F54 includes fixed gradation differences 701f, 702f, 703f, and 704f. As an example, the fixed gradation difference 701f includes a sign bit 701fa and an absolute value 701fb, as illustrated in FIG. 17.

The second shift unit 409 maintains the sign bit 701fa in the fixed gradation difference 701f as is and shifts the absolute value 701fb towards the most significant bit by (M−P) bits, filling the least significant (M−P) bits with "0x0". The second shift unit 409 thus generates a shifted difference 701h as illustrated in the example in FIG. 17.

The shifted difference 701h is composed of a sign bit 701ha, an absolute value 701hb, and an absolute value 701hc. The sign bit 701ha has the same value as the sign bit 701fa. The absolute value 701hb has the same value as the absolute value 701fb. The absolute value 701hc is (M−P) bits with a value of "0x0".

The shifted difference data D11 is composed of the same number of frames as the number of frames included in the fixed gradation difference data D8. As illustrated in FIG. 17, the shifted difference data D11 includes frames F71, F72, F73, F74, and F75 corresponding to the frames F51, F52, F53, F54, and F55 of the fixed gradation difference data D8. In each frame included in the shifted difference data D11, a plurality of pixels are arranged in a matrix. Each pixel has a 12-bit shifted difference for each primary color R, G, and B.

Next, the second shift unit 409 outputs the generated shifted difference data D11 to the combination unit 404.

(6) First Decompression Unit 402

The first decompression unit 402 receives the compressed video D3 from the read unit 401. Upon receiving the compressed video D3, the first decompression unit 402 applies a decompression algorithm to the received compressed video D3, thereby generating the decompressed video D4. The decompression algorithm is the same as the decompression algorithm used by the decompression unit 105 in the production apparatus 100. Next, the first decompression unit 402 outputs the generated decompressed video D4 to the first shift unit 403.

Figure 16:
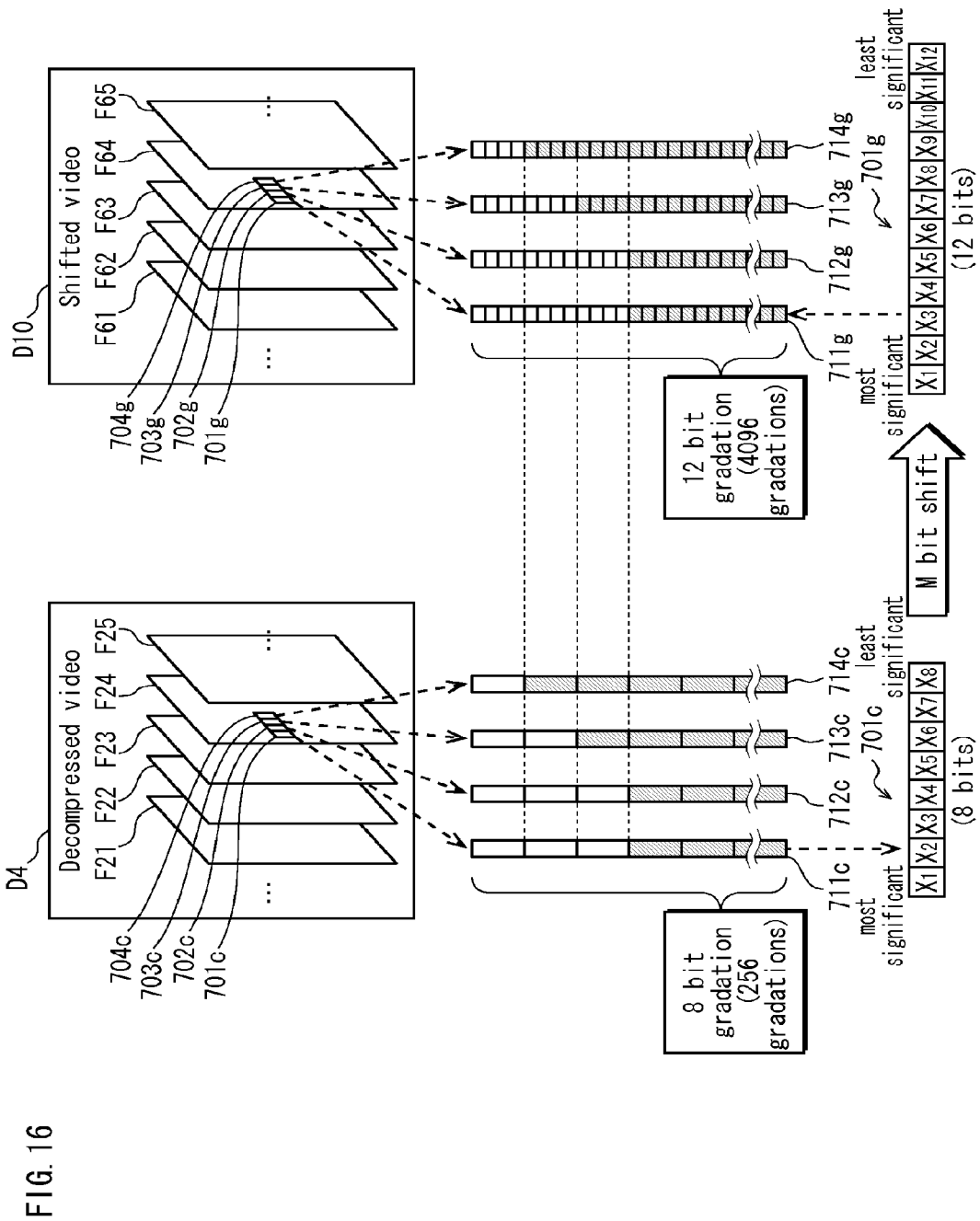
FIG. 16 illustrates an example of the data structure of the decompressed video D4 and of shifted video D10.

FIG. 16 illustrates an example of the decompressed video D4. As illustrated in FIG. 16, the decompressed video D4 includes frames F21, F22, F23, F24, and F25, and in each frame included in the decompressed video D4, a plurality of pixels are arranged in a matrix. Each pixel has 8-bit primary color data for each primary color R, G, and B. In frame F24, a pixel at one location includes a primary color 701c, and other pixels include primary colors 702c, 703c, and 704c.

(7) First Shift Unit 403

The first shift unit 403 receives the shift instruction and the offset shift amount M from the shift amount analysis unit 407. The first shift unit 403 also receives the decompressed video D4 from the first decompression unit 402.

The first shift unit 403 generates the shifted video D10 by shifting the bits in each piece of primary color data of each pixel in each frame of the received decompressed video D4 by the offset shift amount M indicated by the shift amount analysis unit 407.

FIG. 16 illustrates an example of the shifted video D10. As illustrated in FIG. 16, the primary color 701c of the decompressed video D4 has a length of eight bits. The first shift unit 403 shifts the bits in the primary color 701c towards the most significant bit by the offset shift amount M, filling the least significant M bits with "0x0". As a result, a primary color 701g is generated. The most significant bits of the primary color 701g have the same value as the primary color 701c, whereas the M least significant bits have a value of "0x0".

The shifted video D10 thus generated includes the same number of frames as the number of frames in the decompressed video D4. As illustrated in FIG. 16, the shifted video D10 includes frames F61, F62, F63, F64, and F65 corresponding to frames F21, F22, F23, F24, and F25 in the decompressed video D4, and in each frame included in the shifted video D10, a plurality of pixels are arranged in a matrix. Each pixel has 12-bit primary color data for each primary color R, G, and B. Accordingly, each primary color is represented by 4096 gradations.

The first shift unit 403 outputs the generated shifted video D10 to the combination unit 404.

(8) Combination Unit 404

The combination unit 404 receives the shifted video D10 from the first shift unit 403 and receives the shifted difference data D11 from the second shift unit 409. Upon receiving the shifted video D10 and the shifted difference data D11, the combination unit 404 adds the primary color data in the shifted video D10 to the primary color data in the shifted difference data for each piece of primary color data of each pixel in each frame, thereby generating the composite video D12.

Figure 18:
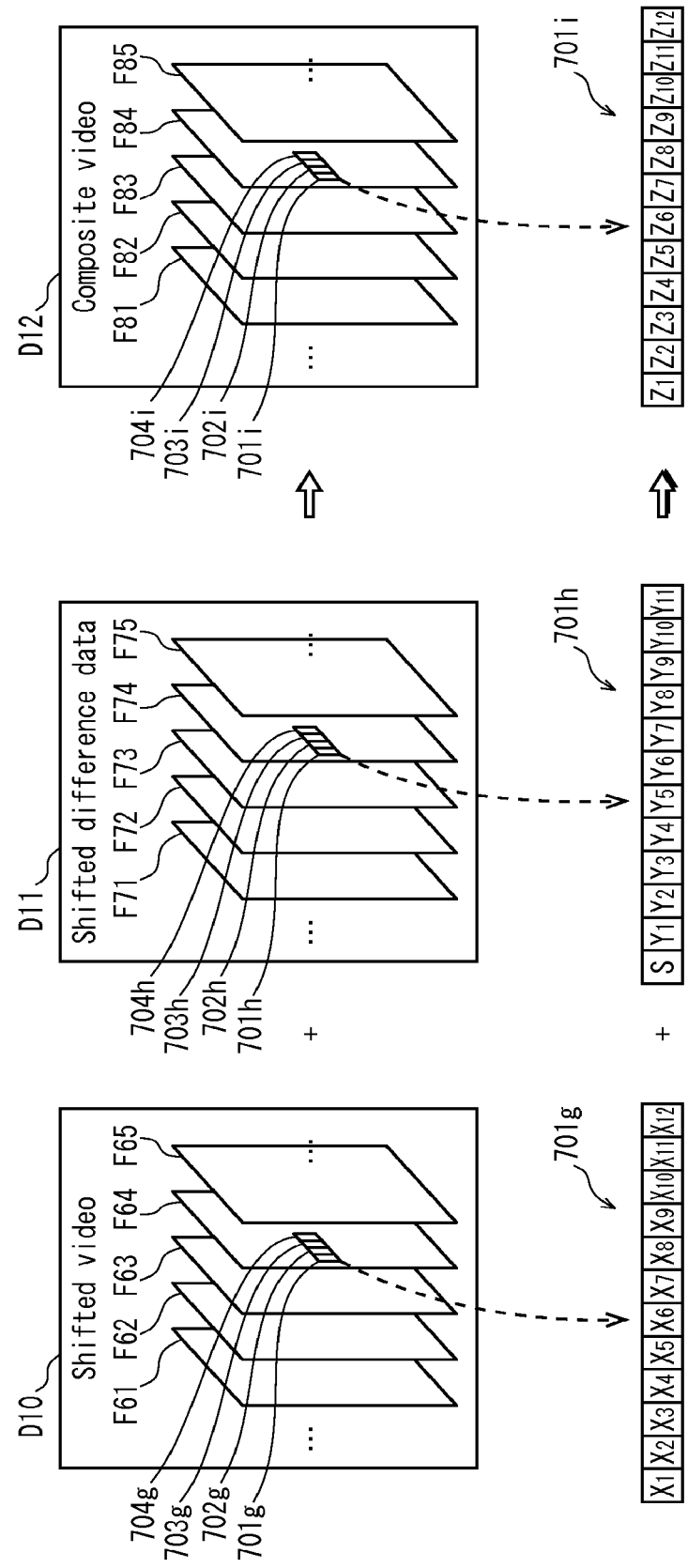
FIG. 18 illustrates the data structure of the shifted video D10, the shifted difference data D11, and composite video D12 when the shifted video D10 and the shifted difference data D11 are combined to generate the composite video D12.

As illustrated by the example in FIG. 18, the shifted video D10 includes frames F61, F62, F63, F64, and F65, and in each frame included in the shifted video D10, a plurality of pixels are arranged in a matrix. Each pixel has 12-bit primary color data for each primary color R, G, and B. Frame F64 includes primary colors 701g, 702g, 703g, and 704g.

As illustrated by the example in FIG. 18, the shifted difference data D11 includes frames F71, F72, F73, F74, and F75, and in each frame included in the shifted difference data D11, a plurality of pixels are arranged in a matrix. Each pixel has a 12-bit shifted difference for each primary color R, G, and B. Frame F74 includes shifted differences 701h, 702h, 703h, and 704h.

The combination unit 404 adds the primary color 701g and the shifted difference 701h, thereby generating a primary color 701i.

As illustrated by the example in FIG. 18, the composite video D12 includes the same number of frames as the number of frames included in the shifted video D10 and the shifted difference data D11. As illustrated in FIG. 18, the composite video D12 includes frames F81, F82, F83, F84, and F85 corresponding to frames F61, F62, F63, F64, and F65 in the shifted video D10, and in each frame included in the composite video D12, a plurality of pixels are arranged in a matrix. Each pixel has 12-bit primary color data for each primary color R, G, and B. Accordingly, each primary color has 4096 gradations.

Next, the combination unit 404 outputs the generated composite video D12 to the third shift unit 405.

The decompressed video D4 illustrated in FIG. 16 has 8-bit primary color data, and each primary color has 256 gradations. By contrast, the composite video D12 illustrated in FIG. 18 has 12-bit primary color data, and each primary color has 4096 gradations. It is therefore clear that gradation representation has been improved in the composite video D12.

(9) Third Shift Unit 405

The third shift unit 405 receives the shift instruction and the shift amount (N−M) from the shift amount analysis unit 407 and receives the composite video D12 from the combination unit 404.

Next, the third shift unit 405 generates the shifted combined video D13 by shifting the bits in each piece of primary color data for each primary color of each pixel in each frame of the received composite video D12 by the shift amount (N−M) received from the shift amount analysis unit 407. Next, the third shift unit 405 outputs the generated shifted combined video D13 to the output unit 406.

The shifted combined video D13 includes a plurality of frames, with a plurality of pixels arranged in a matrix in each frame. Each pixel has primary color data for each primary color.

(10) Output Unit 406

The output unit 406 receives the shifted combined video D13 from the third shift unit 405, performs pre-output image processing on the received shifted combined video D13, and outputs the processed video to an external display apparatus, such as a monitor.

(11) Transmission Unit 410

The transmission unit 410 receives the recording medium ID (D21) of the recording medium 300 from the read unit 401 and transmits the received recording medium ID (D21) to the distribution server apparatus 600.

(12) Reception Unit 413

The reception unit 413 receives the compressed difference data D9 and the shift amount data D20 from the distribution server apparatus 600 and outputs the received compressed difference data D9 and shift amount data D20 to the recording unit 412.

(13) Recording Unit 412

The recording unit 412 receives the compressed difference data D9 and the shift amount data D20 from the reception unit 413 and, in accordance with an instruction from the user of the playback apparatus 400, records the compressed difference data D9 and the shift amount data D20 either in the internal storage unit 411 or on the external storage apparatus 500.

2.7 Structure of External Storage Apparatus 500

Figure 19:
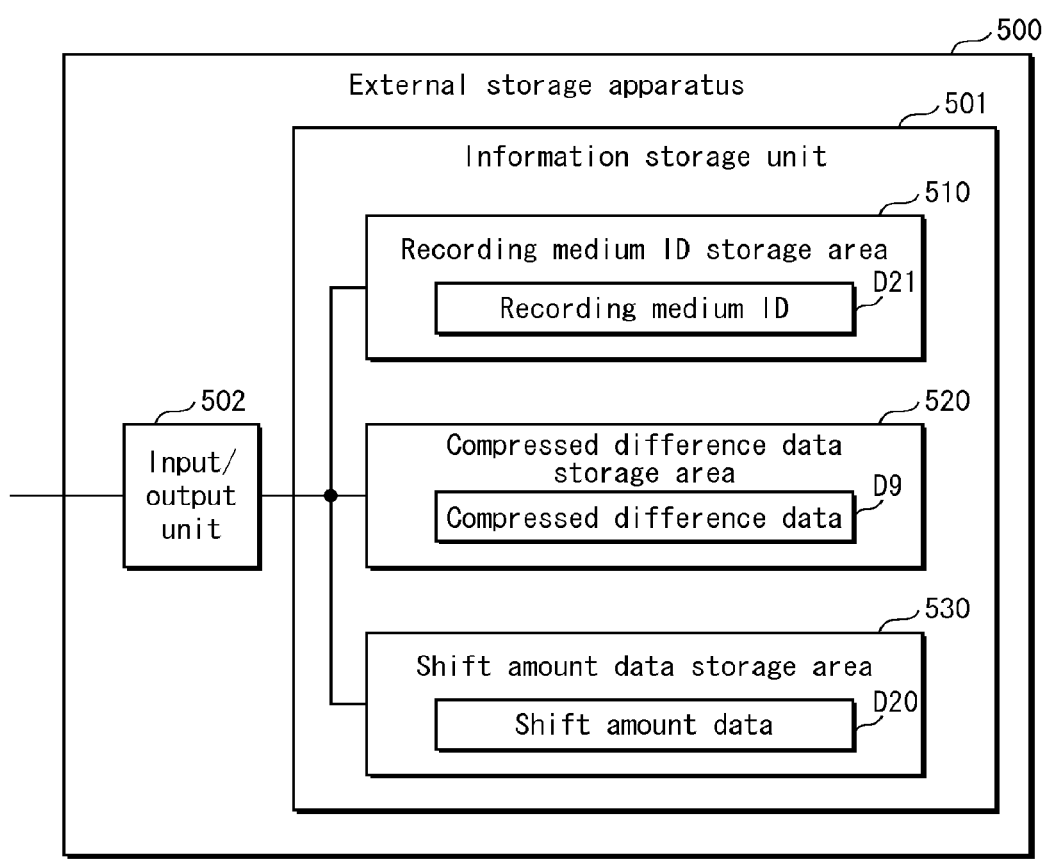
FIG. 19 is a block diagram illustrating the structure of an external storage apparatus 500.

FIG. 19 illustrates the structure of the external storage apparatus 500.

As illustrated in FIG. 19, the external storage apparatus 500 includes an information storage unit 501 and an input/output unit 502. The information storage unit 501 is provided with a recording medium ID storage area 510, a compressed difference data storage area 520, and a shift amount data storage area 530.

The recording medium ID storage area 510 is an area for storing the recording medium ID (D21). In the case of BLU-RAY DISC (registered trademark), examples of information that may be used as the ID that identifies a recording medium include the Content Certificate ID, which is one area of the AACS Content Certificate File recorded in the AACS directory, or a Volume ID recorded and protected by ROM Mark technology.

The compressed difference data storage area 520 is an area for storing the compressed difference data D9. The recording medium 200 has the compressed difference data D9 recorded thereon. By contrast, the recording medium 300 is produced without having the compressed difference data D9 recorded thereon. In this case, the compressed difference data D9 may be stored in the external storage apparatus 500.

The shift amount data storage area 530 is an area for storing the shift amount data D20. The recording medium 200 has the shift amount data D20 recorded thereon. By contrast, the recording medium 300 is produced without having the shift amount data D20 recorded thereon. In this case, the shift amount data D20 may be stored in the external storage apparatus 500.

2.8 Structure of Distribution Server Apparatus 600

The distribution server apparatus 600 provides the compressed difference data D9 and the shift amount data D20 to the playback apparatus 400 owned by the user.

Figure 20:
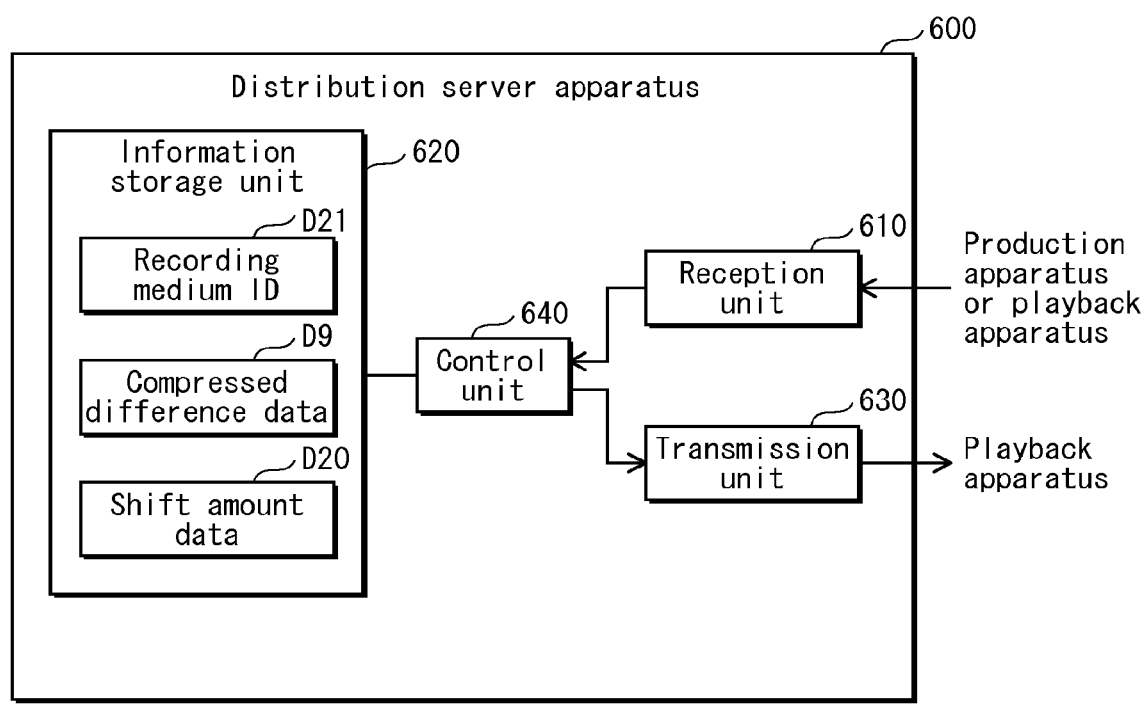
FIG. 20 is a block diagram illustrating the structure of a distribution server apparatus 600.

FIG. 20 illustrates the structure of the distribution server apparatus 600.

As illustrated in FIG. 20, the distribution server apparatus 600 includes a reception unit 610, an information storage unit 620, a transmission unit 630, and a control unit 640.

Specifically, the distribution server apparatus 600 is a computer system composed of a microprocessor, ROM, RAM, a hard disk unit, and the like. The RAM or the hard disk unit stores a computer program. By the microprocessor operating in accordance with the computer program, the distribution server apparatus 600 fulfills its functions.

(1) Reception Unit 610

The reception unit 610 receives the recording medium ID (D21), the compressed difference data D9, and the shift amount data D20 from the production apparatus 100. The reception unit 610 also receives the recording medium ID (D21) from the playback apparatus 400.

Upon receiving the recording medium ID (D21), the compressed difference data D9, and the shift amount data D20 from the production apparatus 100, the reception unit 610 outputs the recording medium ID (D21), the compressed difference data D9, and the shift amount data D20 as a set to the control unit 640. Upon receiving the recording medium ID (D21) from the playback apparatus 400, the reception unit 610 outputs the received recording medium ID (D21) to the control unit 640.

(2) Control Unit 640

Upon receiving the recording medium ID (D21), the compressed difference data D9, and the shift amount data D20 from the reception unit 610, the control unit 640 writes the recording medium ID (D21), the compressed difference data D9, and the shift amount data D20 as a set in the information storage unit 620.

Upon receiving the recording medium ID (D21) from the reception unit 610, the control unit 640 reads as a set, from the information storage unit 620, the compressed difference data D9 and the shift amount data D20 stored in association with the received recording medium ID (D21) and causes the transmission unit 630 to transmit the read compressed difference data D9 and shift amount data D20 to the playback apparatus 400.

(3) Information Storage Unit 620

The information storage unit 620 is provided with a region for storing, as a set, the recording medium ID (D21), the compressed difference data D9, and the shift amount data D20 received by the reception unit 610.

(4) Transmission Unit 630

The transmission unit 630 receives the compressed difference data D9 and the shift amount data D20 from the control unit 640 and transmits the received compressed difference data D9 and shift amount data D20 to the playback apparatus 400.

2.9 Operations of Content Distribution System 10

The following describes operations of the content distribution system 10.

(1) Operations of Production Apparatus 100

Figure 21:
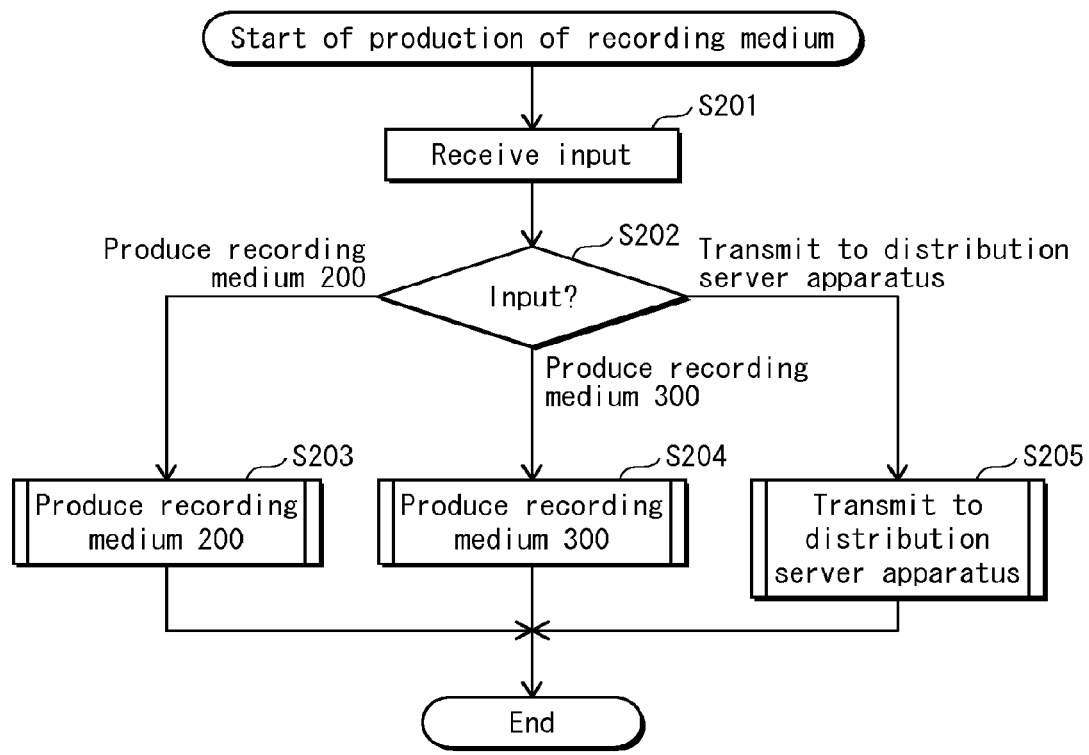
FIG. 21 is a flowchart illustrating operations of the production apparatus 100.

Operations of the production apparatus 100 are described with reference to the flowchart in FIG. 21.

The control unit 115 in the production apparatus 100 receives user input via an input reception unit not illustrated in the figures. The user input is an instruction to produce the recording medium 200, an instruction to produce the recording medium 300, or an instruction for distribution to the distribution server apparatus (step S201).

The control unit 115 determines which of these the user input corresponds to: production of the recording medium 200, production of the recording medium 300, or distribution to the distribution server apparatus (step S202).

If the user input indicates production of the recording medium 200 (step S202: "production of recording medium 200"), the control unit 115 causes the production apparatus 100 to produce the recording medium 200 (step S203).

If the user input indicates production of the recording medium 300 (step S202: "production of recording medium 300"), the control unit 115 causes the production apparatus 100 to produce the recording medium 300 (step S204).

If the user input indicates transmission to the distribution server apparatus 600 (step S202: "transmission to the distribution server apparatus"), the control unit 115 causes the production apparatus 100 to transmit to the distribution server apparatus (step S205).

(2) Operations of Production Apparatus 100 for Production of Recording Medium 300

Figure 22:
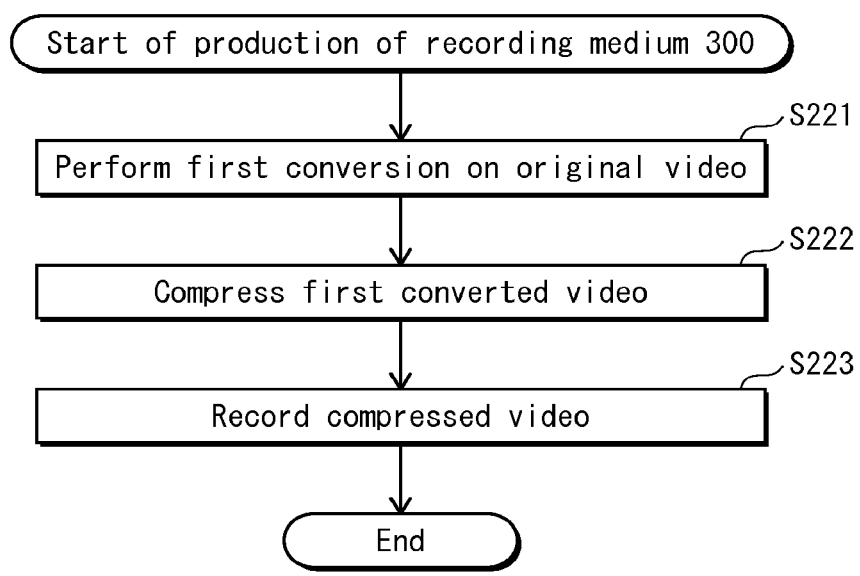
FIG. 22 is a flowchart illustrating operations for production of the recording medium 300 by the production apparatus 100.

Operations of the production apparatus 100 for production of the recording medium 300 are described with reference to the flowchart in FIG. 22. Note that the operations described here are details on step S204 in FIG. 21.

The first conversion unit 102 applies the first conversion to the original video D1 read from the video storage unit 101, thereby generating the first converted video D2 (step S221). The first compression unit 103 compresses the first converted video D2, thereby generating the compressed video D3 (step S222). The first recording unit 104 then records the compressed video D3 on the recording medium 300 (step S223).

(3) Operations of Production Apparatus 100 for Production of Recording Medium 200

Figure 23:
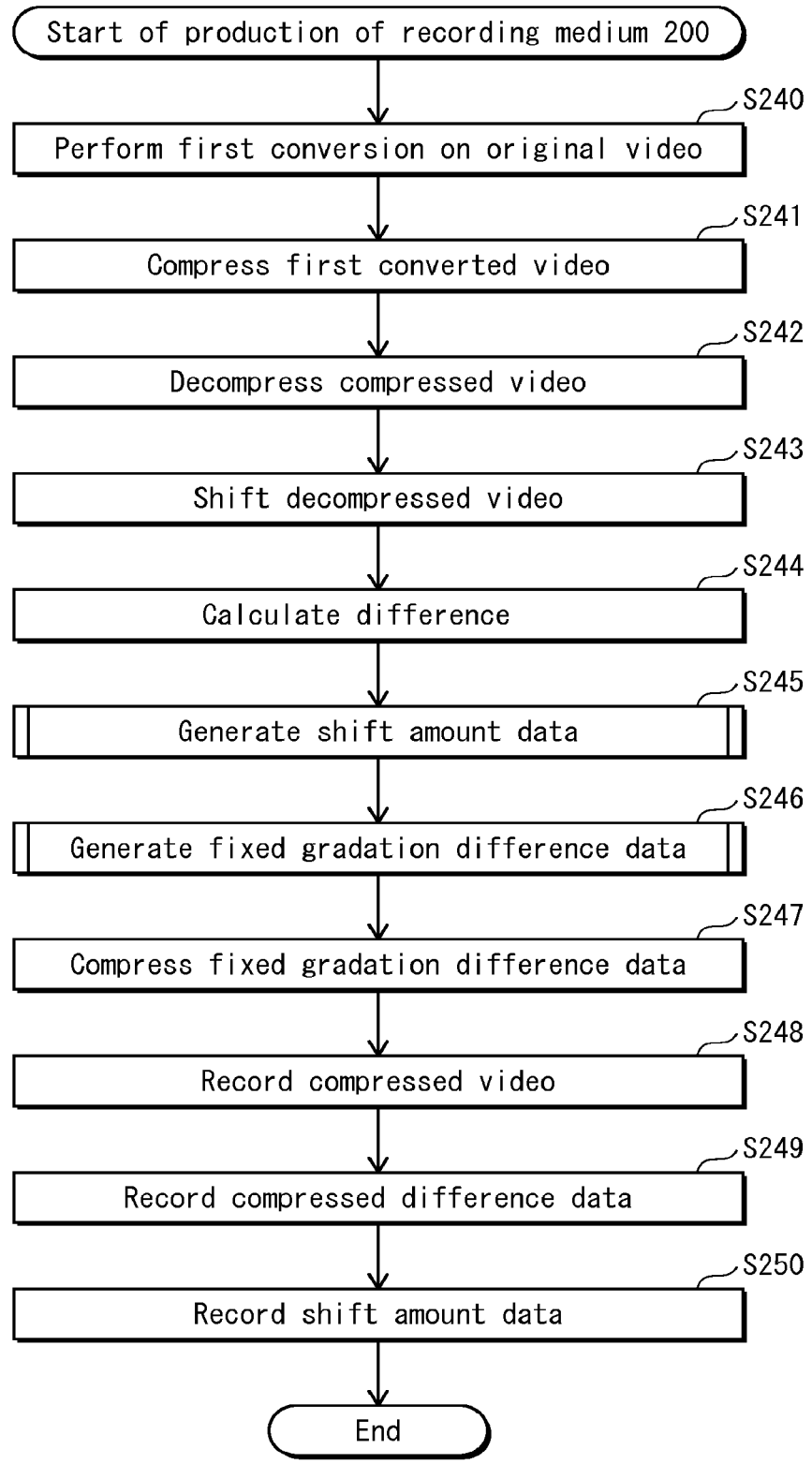
FIG. 23 is a flowchart illustrating operations for production of the recording medium 200 by the production apparatus 100.

Operations of the production apparatus 100 for production of the recording medium 200 are described with reference to the flowchart in FIG. 23. Note that the operations described here are details on step S203 in FIG. 21.

The first conversion unit 102 applies the first conversion to the original video D1 read from the video storage unit 101, thereby generating the first converted video D2 (step S240). The first compression unit 103 compresses the first converted video D2, thereby generating the compressed video D3 (step S241).

The decompression unit 105 decompresses the compressed video D3 generated by the first compression unit 103, thereby generating the decompressed video D4 (step S242).

The shift unit 107 shifts the bits of the decompressed video D4 generated by the decompression unit 105, thereby generating the shifted decompressed video D5 (step S243).

The difference calculation unit 108 calculates the difference between the original video D1 and the shifted decompressed video D5, thereby generating the difference data D7 (step S244).

The shift amount data generation unit 109 generates the shift amount data D20 (step S245).

The reduction unit 110 generates the fixed gradation difference data D8 (step S246).

The second compression unit 111 compresses the fixed gradation difference data D8, thereby generating the compressed difference data D9 (step S247).

The first recording unit 104 records the compressed video D3 on the recording medium 200 (step S248), and the second recording unit 113 records the compressed difference data D9 and the shift amount data D20 stored in the storage unit 112 on the recording medium 200 (steps S249 and S250).

Figure 24:
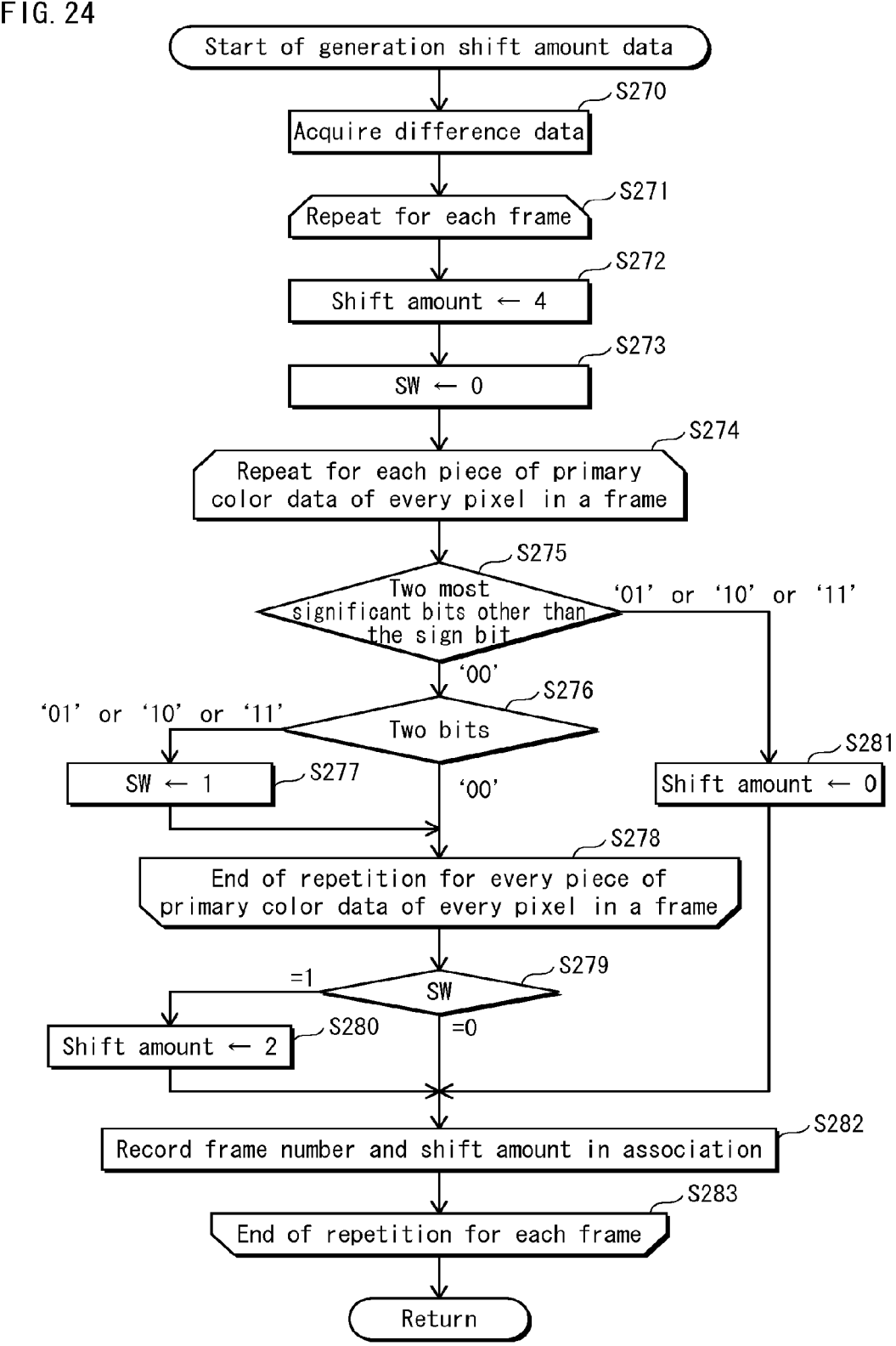
FIG. 24 is a flowchart illustrating operations for generation of shift amount data by the shift amount data generation unit 109 in the production apparatus 100.

(4) Operations of Production Apparatus 100 for Generation of Shift Amount Data Operations for generation of shift amount data by the shift amount data generation unit 109 in the production apparatus 100 are described with reference to the flowchart in FIG. 24. Note that the operations described here are details on step S245 in FIG. 23.

The shift amount data generation unit 109 receives the difference data D7 from the difference calculation unit 108 (step S270).

Next, the shift amount data generation unit 109 repeats steps S272 through S282 below one frame at a time for all of the frames included in the difference data D7 (step S271 through S283).

The shift amount data generation unit 109 tentatively sets the shift amount P to be "4" (step S272) and sets a determination flag SW to "0".

The shift amount data generation unit 109 repeats steps S275 through S277 below for each piece of primary color data of each pixel in a frame (step S274 through S278).

The shift amount data generation unit 109 determines whether the two most significant bits other than the sign bit in the primary color data corresponding to the primary color are "00" or a different value ("01", "10", or "11") (step S275).

When determining that the two most significant bits other than the sign bit are a different value, i.e. that the two most significant bits other than the sign bit are "01", "10", or "11" (step S275: "01", "10", or "11"), the shift amount data generation unit 109 sets the shift amount P to "0" (step S281), terminates the repetition for the frame, and transitions control to step S282.

When determining that the two most significant bits other than the sign bit are "00" (step S275: "00"), the shift amount data generation unit 109 determines whether the two bits following the two most significant bits other than the sign bit are "00" or a different value ("01", "10", or "11") (step S276).

When determining that the two bits following the two most significant bits other than the sign bit are "00" (step S276: "00"), the shift amount data generation unit 109 does nothing.

When determining that the two bits following the two most significant bits other than the sign bit are a different value, i.e. that the two bits following the two most significant bits other than the sign bit are "01", "10", or "11" (step S276: "01", "10", or "11"), the shift amount data generation unit 109 sets the flag SW to "1" (step S277).

Once repetition for each piece of the primary color data for all of the pixels in a frame is complete in steps S274 through S278, the shift amount data generation unit 109 determines whether the flag SW is "1" (step S279).

When determining that the flag SW is "1" (step S279: "=1"), the shift amount data generation unit 109 sets the shift amount P to "2" (step S280). On the other hand, when determining that the flag SW is "0" (step S279: "=0"), the shift amount data generation unit 109 does nothing.

Next, the shift amount data generation unit 109 associates the shift amount P with the frame number and writes the shift amount P and frame number in the shift amount data D20 (step S282).

Once repetition for each frame is complete in steps S271 through S283, the shift amount data generation unit 109 terminates processing for generating the shift amount data.

Figure 25:
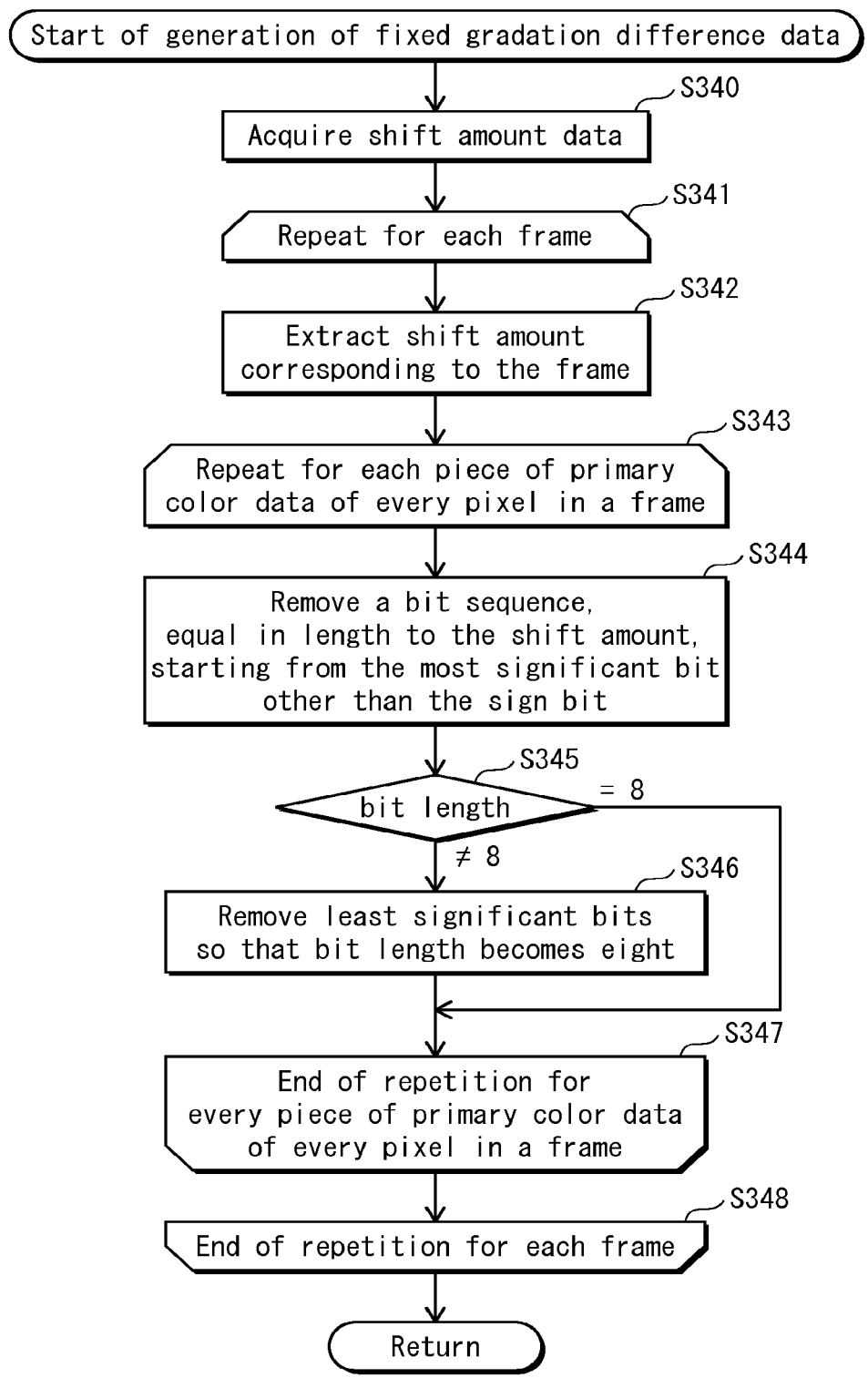
FIG. 25 is a flowchart illustrating operations for generation of fixed gradation difference data by the reduction unit 110 in the production apparatus 100.

(5) Operations of Production Apparatus 100 for Generation of Fixed Gradation Difference Data Operations for generation of the fixed gradation difference data by the reduction unit 110 in the production apparatus 100 are described with reference to the flowchart in FIG. 25. Note that the operations described here are details on step S246 in FIG. 23.

The reduction unit 110 receives the shift amount data D20 from the shift amount data generation unit 109 and receives the difference data D7 from the difference calculation unit 108 (step S340).

Next, the reduction unit 110 repeats steps S342 through S347 below one frame at a time for all of the frames included in the difference data D7 (step S341 through S348).

The reduction unit 110 extracts the shift amount P corresponding to the frame from the shift amount data D20 (step S342).

Next, the reduction unit 110 repeats steps S344 through S346 below for each piece of primary color data of each pixel in a frame (step S343 through S347).

The reduction unit 110 removes a bit sequence starting from the most significant bit other than the sign bit, thereby generating the primary reduction difference. The length of the removed bit sequence is the shift amount P (step S344).

Next, the reduction unit 110 determines whether the bit length of the primary reduction difference is "8" (step S345). When determining that the bit length of the primary reduction difference is not "8" (step S345), the reduction unit 110 removes the least significant bits so that the bit length becomes "8", thereby generating the fixed gradation difference (step S346). When determining that the bit length of primary reduction difference is "8" (step S345), the reduction unit 110 does nothing. In other words, the primary reduction difference is maintained as is, becoming the fixed gradation difference.

Once repetition for each piece of the primary color data for all of the pixels in a frame is complete in steps S343 through S347, and the repetition for each frame is complete in steps S341 through S348, the reduction unit 110 terminates processing for generating the fixed gradation difference data.

(6) Operations for Transmission from Production Apparatus 100 to Distribution Server Apparatus 600

Figure 26:
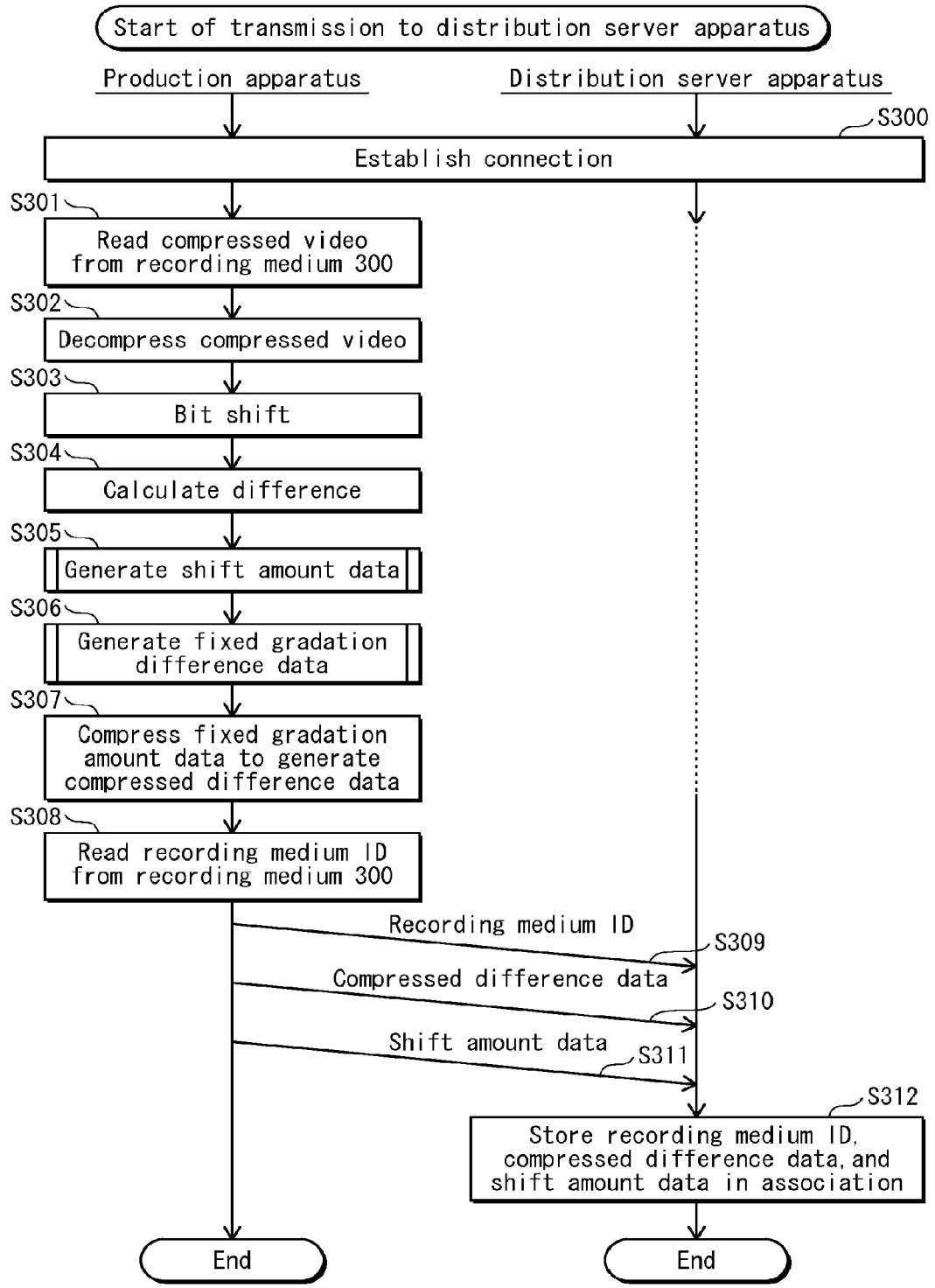
FIG. 26 is a flowchart illustrating operations for transmission of the compressed difference data D9 and the shift amount data D20 from the production apparatus 100 to the distribution server apparatus 600.

Operations for transmission of the compressed difference data D9 and the shift amount data D20 from the production apparatus 100 to the distribution server apparatus 600 are described with reference to the flowchart in FIG. 26. Note that the operations described here are details on step S205 in FIG. 21.

The connection for communication between the production apparatus 100 and the distribution server apparatus 600 is established (step S300).

Next, the read unit 106 of the production apparatus 100 reads the compressed video D3 from the recording medium 300 (step S301). The decompression unit 105 then decompresses the read compressed video D3, thereby generating the decompressed video D4 (step S302). Next, the shift unit 107 shifts the bits in the decompressed video D4, thereby generating the shifted decompressed video D5 (step S303).

The difference calculation unit 108 calculates the difference between the original video D1 and the shifted decompressed video D5 stored in the video storage unit 101, thereby generating the difference data D7 (step S304).

The shift amount data generation unit 109 calculates the shift amount P using the difference data D7, thereby generating the shift amount data D20 (step S305). Details on the generation of the shift amount data D20 are as shown in FIG. 24.

The reduction unit 110 reduces the gradation of the difference data D7, thereby generating the fixed gradation difference data D8 (step S306). Details on the generation of the fixed gradation difference data D8 are as shown in FIG. 25.

The second compression unit 111 compresses the fixed gradation difference data D8, thereby generating the compressed difference data D9, and writes the compressed difference data D9 in the storage unit 112 (step S307).

The read unit 106 reads the recording medium ID (D21) from the recording medium 300 and outputs the read recording medium ID (D21) to the transmission unit 114 (step S308).

The transmission unit 114 receives the recording medium ID (D21) from the read unit 106, reads the compressed difference data D9 and the shift amount data D20 from the storage unit 112, and transmits the received recording medium ID (D21) and the read compressed difference data D9 and shift amount data D20 to the distribution server apparatus 600 (steps S309 through S311).

The reception unit 610 in the distribution server apparatus 600 receives the recording medium ID (D21), the compressed difference data D9, and the shift amount data D20 (steps S309 through S311). The control unit 640 writes the received recording medium ID (D21), compressed difference data D9, and shift amount data D20 in the information storage unit 620 (step S312).

(7) Operations by Playback Apparatus 400 for Playback of Content

Figure 27:
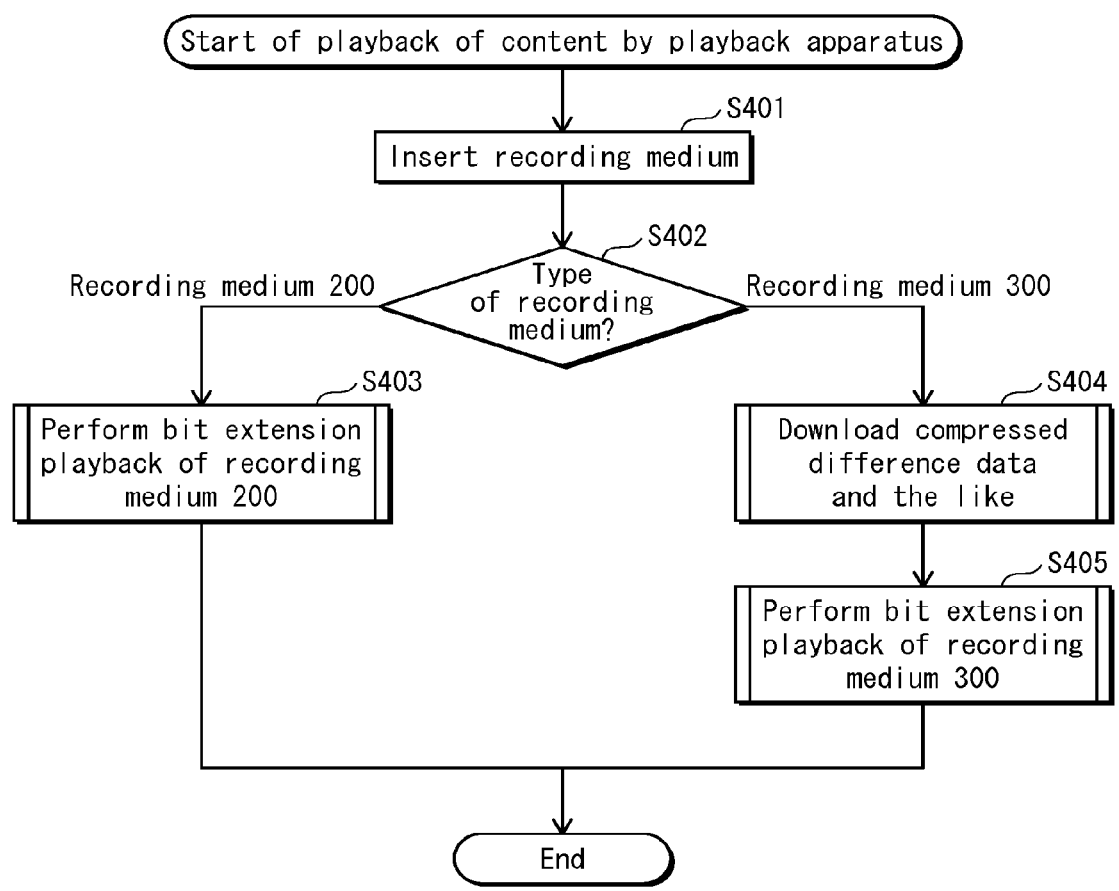
FIG. 27 is a flowchart illustrating operations for playback of a content by the playback apparatus 400.

Operations of the playback apparatus 400 for playback of content are described with reference to the flowchart in FIG. 27.

Once the user inserts a recording medium into the playback apparatus 400 (step S401), the control unit 414 determines, via the read unit 401, whether the compressed difference data D9 and the shift amount data D20 are recorded on the inserted recording medium. In other words, the control unit 414 determines the type of recording medium (step S402). When determining that the compressed difference data D9 and the shift amount data D20 are recorded on the recording medium, the control unit 414 determines that the recording medium is the recording medium 200. On the other hand, when determining that the compressed difference data D9 and the shift amount data D20 are not recorded on the recording medium, the control unit 414 determines that the recording medium is the recording medium 300.

When the inserted recording medium is the recording medium 200 (step S402: "recording medium 200"), the playback apparatus 400 performs bit expansion playback of the recording medium 200 (step S403). On the other hand, when the inserted recording medium is the recording medium 300 (step S402: "recording medium 300"), the playback apparatus 400 downloads compressed different data or the like (step S404) and performs bit expansion playback of the recording medium 300 (step S405).

(8) Operations of Recording Medium 200 for Bit Expansion Playback

The playback apparatus 400 performs bit expansion and playback of the compressed video D3 using the compressed video D3, the compressed difference data D9, and the shift amount data D20 recorded on the recording medium 200. Operations of the playback apparatus 400 for bit expansion playback of content recorded on the recording medium 200 are described with reference to the flowchart in FIG. 28. Note that the operations described here are details on step S403 in FIG. 27.

Before playback of the compressed video D3, the playback apparatus 400 performs pre-processing (1) (step S410a). Details on the pre-processing (1) are described below.

Next, the shift amount analysis unit 407 analyzes the shift amount data D20 read from the recording medium 200 by the read unit 401 and confirms whether or not the shift amount data D20 illustrated in FIG. 10 is listed by disc, and whether or not the shift amount data D20 illustrated in FIG. 9 is listed by compressed video D3. When the shift amount is stipulated by disc or by compressed video D3, the shift amount analysis unit 407 indicates the shift amount P to the second shift unit 409 by disc or by compressed video D3 and instructs the second shift unit 409 to perform a bit shift (step S412).

In parallel with the processing in step S412, the second decompression unit 408 decompresses the compressed difference data D9 read from the second recording medium 200 by the read unit 401, thereby generating the fixed gradation difference data D8 (step S413).

The second shift unit 409 calculates the actual shift amount of (M−P) bits using the offset shift amount (M bits) and the shift amount P indicated by the shift amount analysis unit 407. In the case of an indication by disc, the second shift unit 409 shifts the fixed gradation difference data D8 generated from the compressed difference data D9 by (M−P) bits, thereby generating the shifted difference data D11. In the case of an indication by compressed video D3, the second shift unit 409 shifts the fixed gradation difference data D8 that forms a pair with the compressed video D3 by (M−P) bits, thereby generating the shifted difference data D11 (step S414).

In parallel with the processing in step S412 in step S413, the first decompression unit 402 decompresses the compressed video D3 read from the recording medium 200 by the read unit 401, thereby generating the decompressed video D4 (step S415).

The first shift unit 403 shifts the decompressed video D4 generated by the first decompression unit 402 by M bits in accordance with the offset shift amount M indicated by the shift amount analysis unit 407, thereby generating the shifted video D10 (step S416).

The combination unit 404 combines the shifted video D10 generated by the first shift unit 403 and the shifted difference data D11 generated by the second shift unit, thereby generating the composite video D12 (step S417).

The third shift unit 405 shifts the composite video D12 generated by the combination unit 404 by N−M bits in accordance with the offset shift amount (N−M) indicated by the shift amount analysis unit 407, thereby generating the shifted combined video D13. Furthermore, the output unit 406 performs image processing on the shifted combined video D13 generated by the third shift unit 405, and outputs the processed video to a monitor or the like (step S418).

(9) Pre-Processing (1) in Bit Expansion Playback of Recording Medium 200

Operations for pre-processing (1) during bit expansion playback of the recording medium 200 are described with reference to the flowchart in FIG. 29. Note that the operations described here are details on step S410a in FIG. 28.

The read unit 401 reads the shift amount data D20 from the recording medium 200 (step S431).

Next, the shift amount analysis unit 407 analyzes the shift amount data D20 read from the recording medium 200 by the read unit 401 and confirms whether a maximum shift amount as illustrated in FIG. 11 exists within the shift amount data D20 (step S432).

If a maximum shift amount exists (step S432: "exists"), the shift amount analysis unit 407 sets the offset shift amount M to be the maximum shift amount (step S433). If no maximum shift amount exists (step S432: "does not exist"), the shift amount analysis unit 407 extracts the maximum shift amount from the shift amount data D20 and sets the offset shift amount M to be the extracted maximum shift amount (step S434).

Next, the shift amount analysis unit 407 indicates M bits as the offset shift amount to the first shift unit 403 and the second shift unit 409 and instructs the first shift unit 403 and the second shift unit 409 to perform a bit shift (steps S435 and S436).

The shift amount analysis unit 407 also indicates (N−M) bits to the third shift unit 405 as the offset shift amount and instructs the third shift unit 405 to perform a bit shift (step S437).

Next, the first shift unit 403, the second shift unit 409, the third shift unit 405, and the related first decompression unit 402 and second decompression unit 408 reserve resources necessary for bit expansion playback, such as application memory and a datapath (S438).

The read unit 401 reads the compressed difference data D9 from the recording medium 200 (step S439) and reads the compressed video D3 from the recording medium 200 (step S440).

(10) Operations for Downloading of Compressed Difference Data or the Like

Operations by the playback apparatus 400 for downloading of compressed difference data or the like are described with reference to the flowchart in FIG. 30. Note that the operations described here are details on step S404 in FIG. 27.

The connection for communication between the playback apparatus 400 and the distribution server apparatus 600 is established (step S471).

Next, the read unit 401 in the playback apparatus 400 reads the recording medium ID (D21) from the recording medium 300 (step S472). The transmission unit 410 transmits the read recording medium ID (D21) along with a request for transmission of the compressed difference data D9 and the shift amount data D20 to the distribution server apparatus 600 (step S473).

Next, the reception unit 610 in the distribution server apparatus 600 receipts the transmission request and the recording medium ID (D21) (step S473). The control unit 640 reads the compressed difference data D9 and the shift amount data D20 corresponding to the received recording medium ID (D21) from the information storage unit 620 (step S474). The transmission unit 630 transmits the read compressed difference data D9 and shift amount data D20 to the playback apparatus 400 (step S475).

Next, the reception unit 413 in the playback apparatus 400 receives the compressed difference data D9 and the shift amount data D20 (step S475). The recording unit 412 writes the received compressed difference data D9 and shift amount data D20 in association with the read recording medium ID (D21) in either the external storage apparatus 500 or the internal storage unit 411 (step S476). Next, the control unit 414 performs post-processing, such as releasing memory (step S477).

(11) Operations of Recording Medium 300 for Bit Expansion Playback

The playback apparatus 400 performs bit expansion and playback of the compressed video D3 recorded on the recording medium 300 using the compressed difference data D9 and the shift amount data D20, recorded on either the external storage apparatus 500 or the internal storage unit 411. Operations of the playback apparatus 400 for bit expansion playback of content recorded on the recording medium 300 are described with reference to the flowchart in FIG. 31.

Before playback of the compressed video D3, the playback apparatus 400 performs pre-processing (2) (step S410b).

Figure 28:
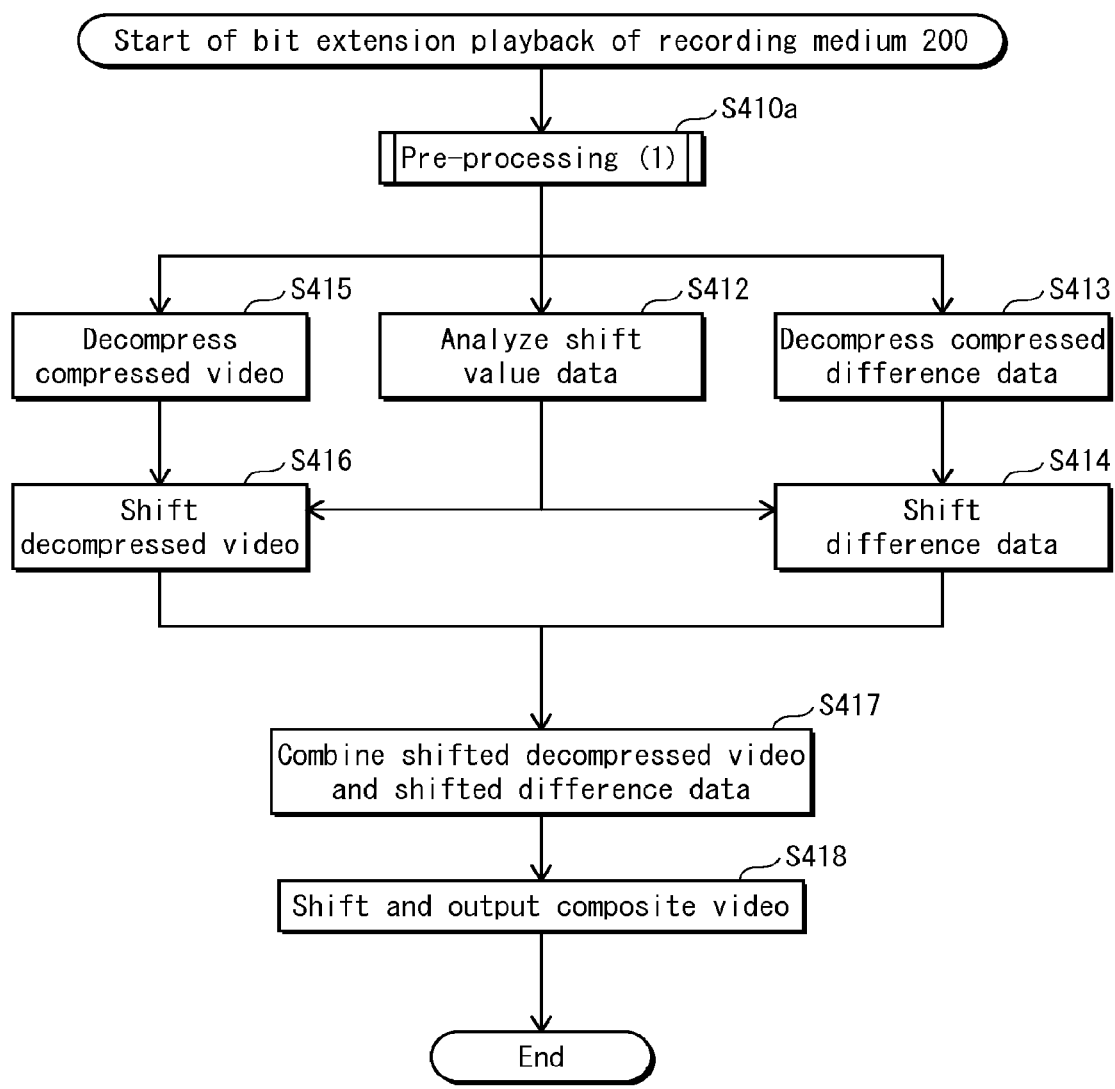
FIG. 28 is a flowchart illustrating operations for bit extension playback of a content recorded on the recording medium 200.

Subsequent operations are the same as in steps S412 through S418 in FIG. 28, and therefore a description thereof is omitted.

(12) Pre-Processing (2) in Bit Expansion Playback of Recording Medium 300

Operations for pre-processing (2) during bit expansion playback of the recording medium 300 are described with reference to the flowchart in FIG. 32. Note that the operations described here are details on step S410b in FIG. 31.

The read unit 401 reads the recording medium ID (D21) from the recording medium 300 (step S451).

The control unit 414 determines, via the read unit 401, whether the recording medium ID (D21) read from the recording medium 300 exists in either the external storage apparatus 500 or the internal storage unit 411 (step S452).

When determining that the recording medium ID (D21) exists in neither the external storage apparatus 500 nor the internal storage unit 411 (step S452: "does not exist"), the playback apparatus 400 terminates playback processing of the content.

When determining that the recording medium ID (D21) exists in either the external storage apparatus 500 or the internal storage unit 411 (step S452: "exists"), the read unit 401 reads, from either the external storage apparatus 500 or the internal storage unit 411, the compressed difference data D9 and the shift amount data D20 stored in correspondence with the recording medium ID (D21) read from the recording medium 300 (step S453).

Figure 29:
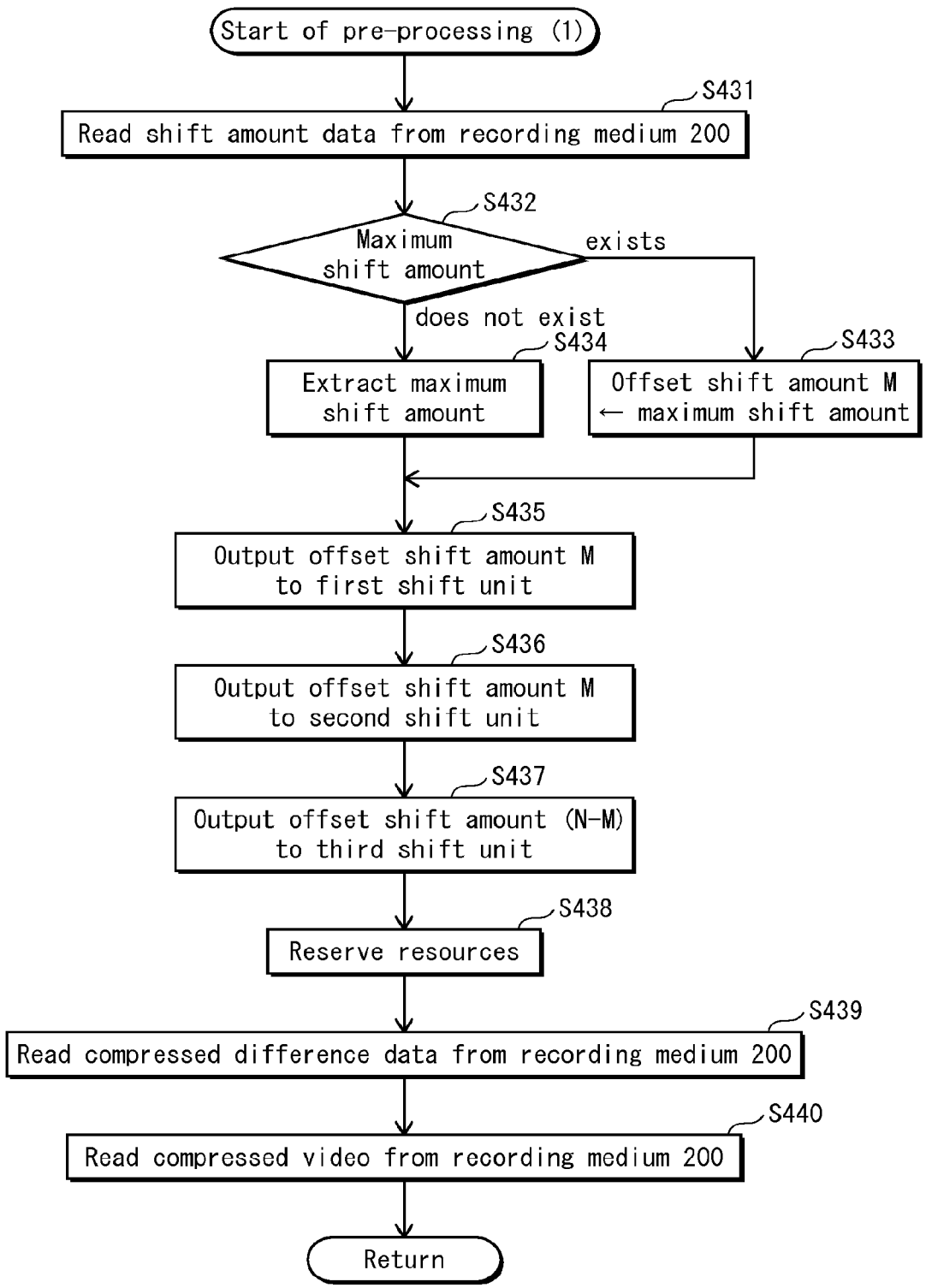
FIG. 29 is a flowchart illustrating operations for pre-processing (1) during bit extension playback of a content recorded on the recording medium 200.

Subsequent steps S454 through S460 are the same as steps S432 through S438 in FIG. 29, and therefore a description thereof is omitted.

Next, after step S460, the read unit 401 reads the compressed video D3 from the recording medium 300 (step S461).

2.10 Summary

As described above, apart from producing a distribution content, the production apparatus 100 generates difference information to compensate for information lost during the production process of the distribution content and converts the difference data to a standard gradation depth that can be effectively processed by an existing LSI, both to prevent the data size of the difference data from growing too large and to prevent the difference data from necessitating a major change in the design of existing LSIs. So that the result of combining the distribution content with the difference information will yield an effective improvement in color tones, the production apparatus 100 determines the shift amount to use in combining and generates the shift amount as meta-information when converting the gradation depth. During playback, the distribution content, the difference information, and the meta-information storing the shift amount are combined for playback, thereby achieving playback of content with an improved color tone expression as compared to when the distribution content alone is played back.

3. OTHER MODIFICATIONS

While the present invention has been described based on the above embodiments, the present invention is of course not limited to these embodiments. The present invention also includes cases such as the following.

Figure 32:
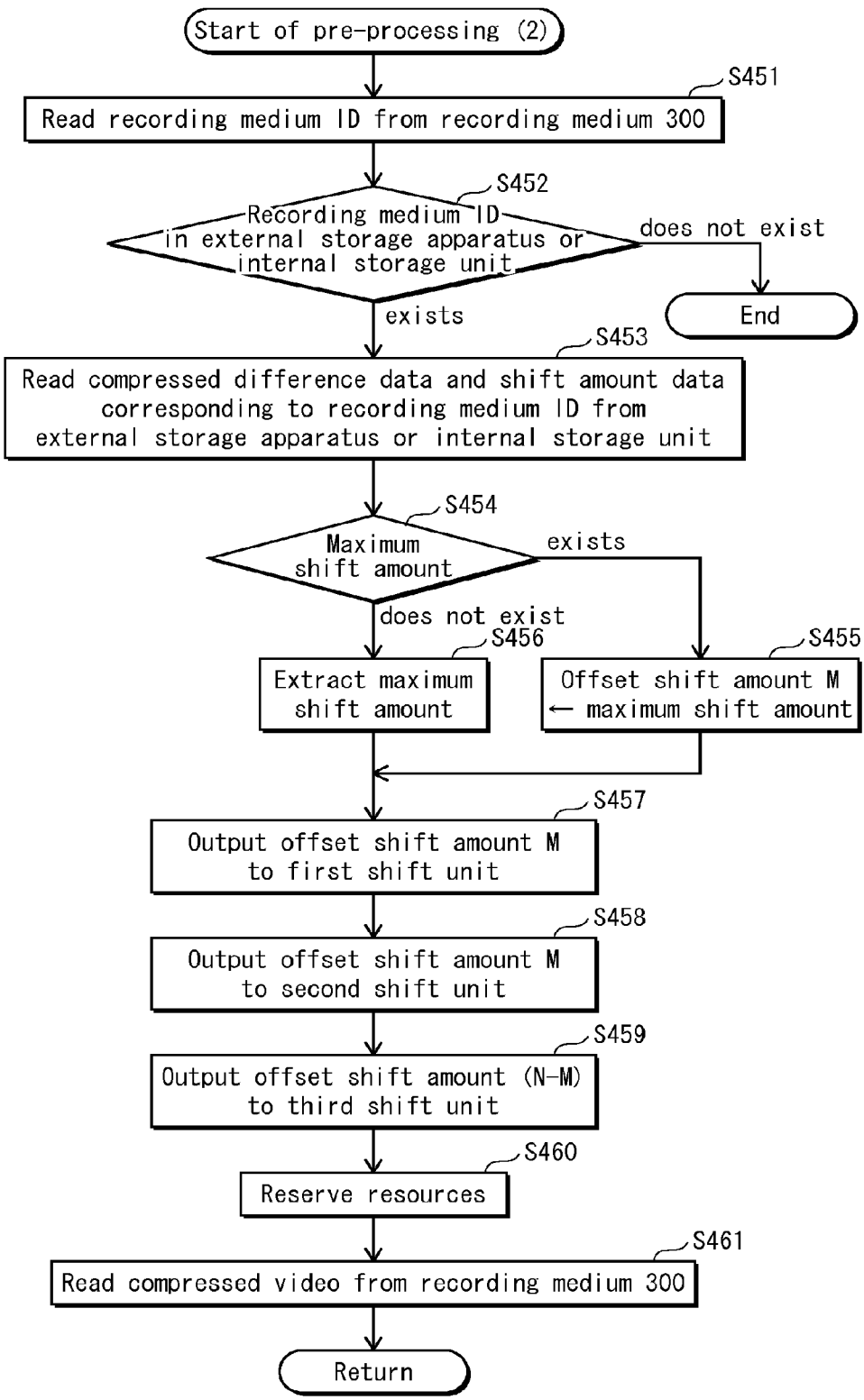
FIG. 32 is a flowchart illustrating operations for pre-processing (2) during bit extension playback of a content recorded on the recording medium 300.

(1) In step S451 of FIG. 32, the read unit 430 reads the recording medium ID (D21) from the recording medium 300, and in step S452, it is determined whether the read recording medium ID (D21) is recorded on either of the external storage apparatus 500 or the internal storage unit 411.

Here, it may be determined whether the compressed difference data D9 and the shift amount data D20 corresponding to the read recording medium ID (D21) are recorded on either of the external storage apparatus 500 or the internal storage unit 411.

Figure 30:
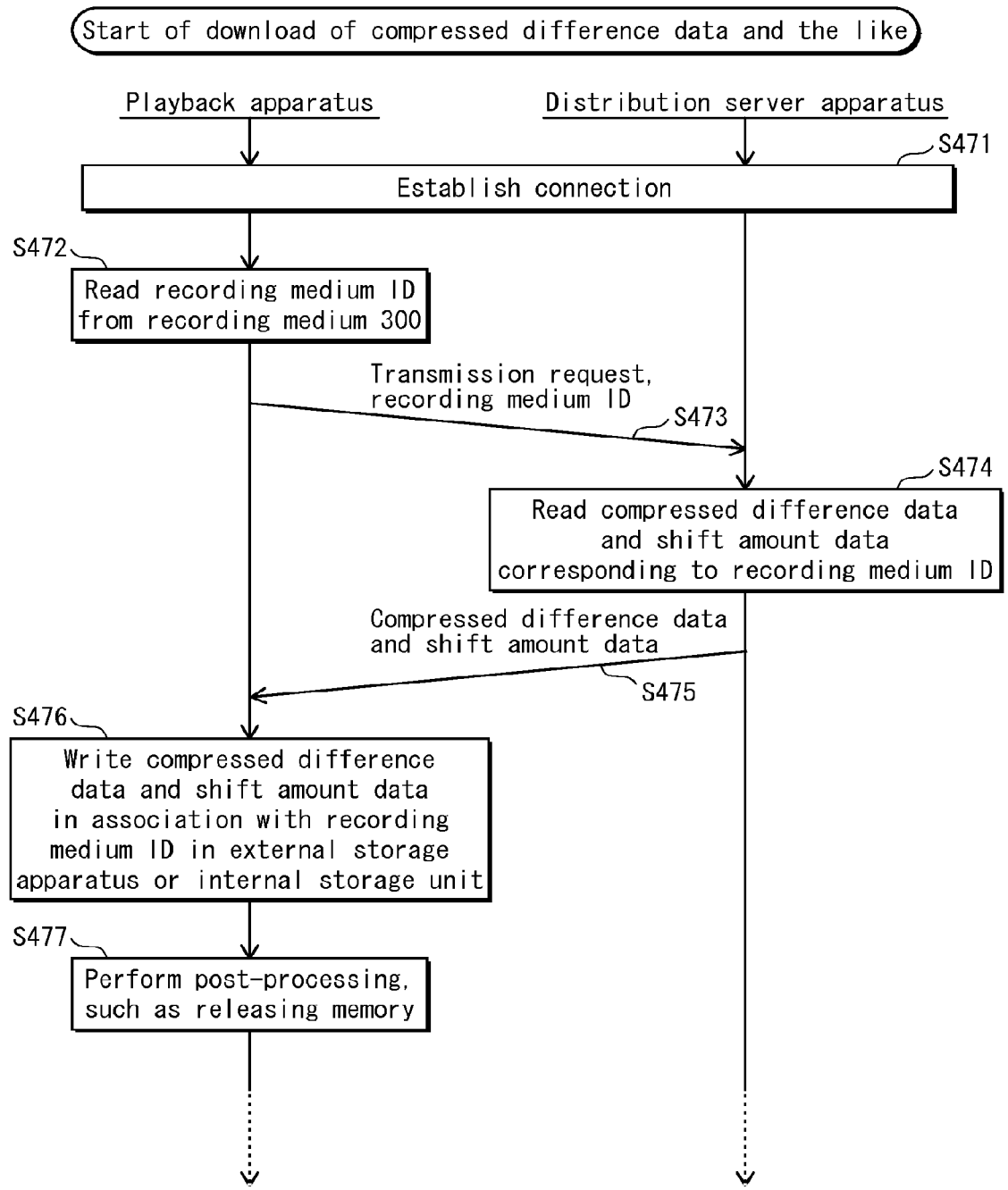
FIG. 30 is a flowchart illustrating operations for downloading of compressed difference data and the like from the distribution server apparatus 600 to the playback apparatus 400.

When the read recording medium ID (D21) is not recorded on either of the external storage apparatus 500 or the internal storage unit 411, or when the compressed difference data D9 and the shift amount data D20 corresponding to the read recording medium ID (D21) are not recorded on either of the external storage apparatus 500 or the internal storage unit 411, the playback apparatus 400 may perform processing to download the compressed difference data or the like illustrated in FIG. 30 and acquire the compressed difference data D9 and the shift amount data D20 corresponding to the recording medium ID (D21) necessary for playback. After acquisition, the playback apparatus 400 may perform the processing in FIG. 32 from step S454 onwards.

Figure 31:
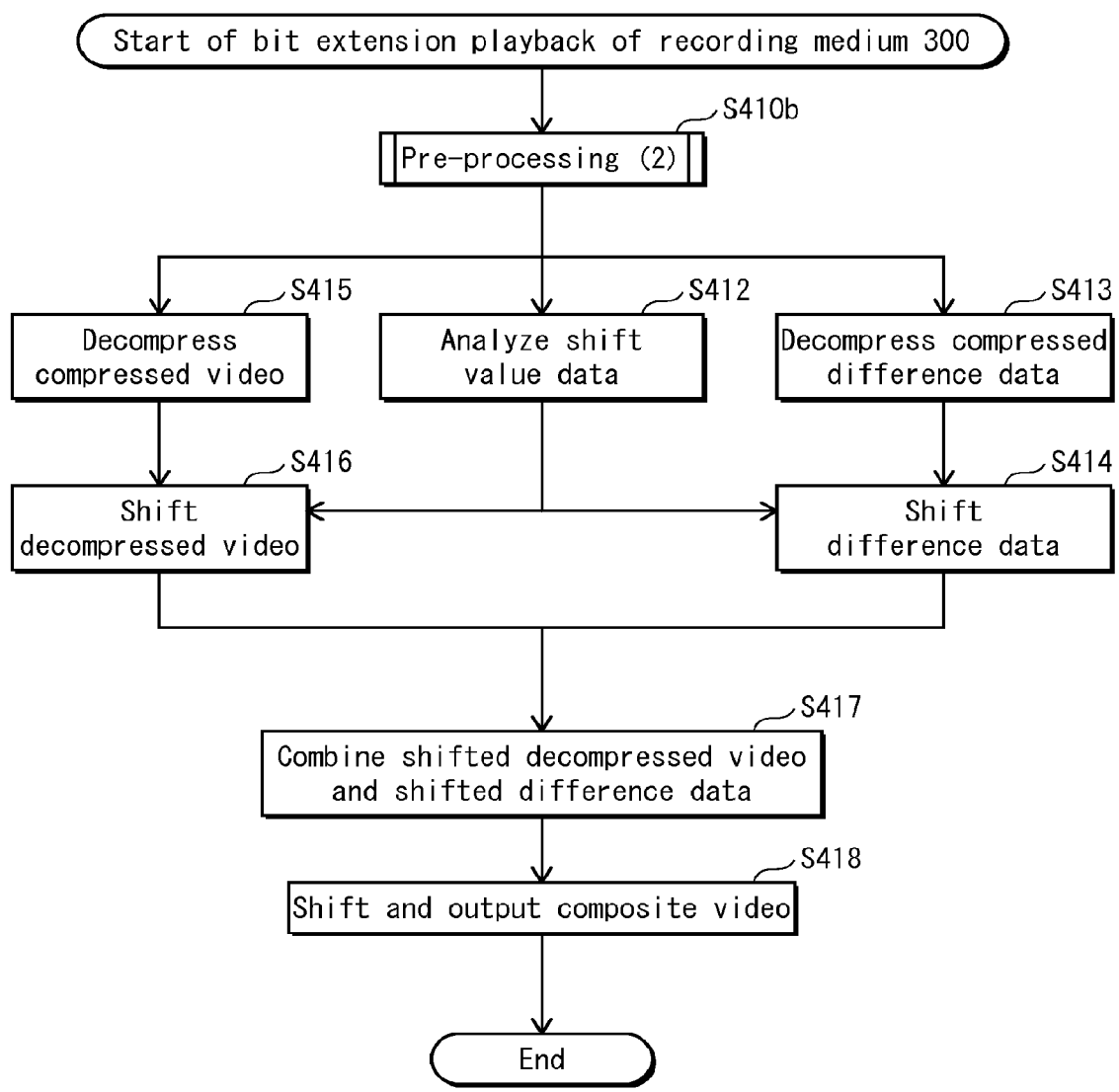
FIG. 31 is a flowchart illustrating operations for bit extension playback of a content recorded on the recording medium 300.

(2) During the bit extension playback illustrated in FIGS. 28 and 31, before playback, the first shift unit 403 and the second shift unit 409 are provided notification of the offset shift amount M bits, and the third shift unit 405 is provided notification of the offset shift amount (N−M) bits. Upon the start of playback, the shift amount P is indicated to the second shift unit 409, and during the playback flow for a certain compressed video D3, the first shift unit 403 is instructed to shift bits by M bits, the second shift unit 409 is instructed to shift bits by (M−P) bits, and the third shift unit 405 is instructed to shift bits (N−M) bits. Operations are not, however, limited in this way.

For a certain disc, when the shift amount P differs for each compressed video D3, the first shift unit 403 and the third shift unit 405 may have a unique shift amount for the disc, with the setting of the shift amount being changed for each compressed video D3 only for the second shift unit 409. When the compressed video D3 being played back changes, the target of control by the shift amount analysis unit 407 in this case is only the second shift unit 409. Therefore, synchronized control is unnecessary, making it possible to avoid a relative increase in complexity.

Another possible structure is to provide notification, before playback, to the third shift unit 405 of the offset shift amount N bits. Upon the start of playback, the shift amount of P bits is then indicated to the first shift unit 403 and the third shift unit 405. The first shift unit 403 is caused to shift bits by P bits, and the third shift unit 405 is caused to shift bits by N−P bits. With this structure, combined playback with the same shift amount as in Embodiment 1 is possible without causing the second shift unit 409 to shift any bits whatsoever. Adopting this structure makes implementation of the second shift unit 409 in the playback apparatus 400 unnecessary, thereby simplifying the structure.

(3) Each of the above apparatuses is, specifically, a computer system composed of a microprocessor, ROM, RAM, a hard disk unit, and the like. The RAM or the hard disk unit stores a computer program. The computer program is composed of a combination of multiple instruction codes indicating instructions for a computer in order to achieve predetermined functions. By the microprocessor operating in accordance with the computer program, each apparatus fulfills its functions. In other words, the microprocessor fetches the computer instructions one at a time from the computer program, decodes the fetched computer instruction, and operates in accordance with the result of decoding.

Note that each apparatus is not limited to a computer system that includes a microprocessor, ROM, RAM, a hard disk unit, and the like, but may also be a computer system composed of a portion of these elements.

By the microprocessor operating in accordance with the instructions included in the computer program stored in the RAM or the hard disk unit, the computer program and microprocessor may appear to constitute one hardware circuit, and the hardware circuit may appear to be operating.

(4) A portion or all of the constituent elements in each of the above apparatuses may be composed of one system LSI (Large Scale Integration). A system LSI is an ultra-multifunctional LSI produced by integrating multiple components on one chip and, more specifically, is a computer system including a microprocessor, ROM, RAM, and the like. A computer program is stored in the RAM. By the microprocessor operating in accordance with the computer program, the system LSI fulfills its functions.

Each of the constituent elements in each of the above apparatuses may be separately integrated into a single chip, or a portion or all of the constituent elements may be integrated into a single chip. While the term LSI has been used here, depending on the degree of integration, the terms IC, system LSI, super LSI, and ultra LSI are also used.

In addition, the method for assembling integrated circuits is not limited to LSI, and a dedicated communication circuit or a general-purpose processor may be used. An FPGA (Field Programmable Gate Array), which is programmable after the LSI is manufactured, or a reconfigurable processor, which allows reconfiguration of the connection and setting of circuit cells inside the LSI, may be used.

Furthermore, if technology for forming integrated circuits that replaces LSIs emerges, owing to advances in semiconductor technology or to another derivative technology, the integration of functional blocks may naturally be accomplished using such technology. The application of biotechnology or the like is possible.

(5) A portion or all of the constituent elements constituting each of the above apparatuses may be constituted by an IC card, or an individual module, that is removable from the apparatus. The IC card or module is, specifically, a computer system composed of a microprocessor, ROM, RAM, and the like. The IC card or the module may include the above ultra-multifunctional LSI. The microprocessor operates according to a computer program, and the IC card or the module thereby accomplishes its functions. The IC card or the module may be tamper resistant.

(6) The present invention may also be the above-described method. The present invention may be a computer program that achieves the method by a computer or may be a digital signal comprising the computer program.

The present invention may also be a computer-readable recording medium, such as a flexible disk, hard disk, CD-ROM, MO, DVD, DVD-ROM, DVD-RAM, BD (BLU-RAY DISC (registered trademark)), or semiconductor memory, on which the above computer program or digital signal is recorded. The present invention may also be the computer program or digital signal recorded on such a recording medium.

The present invention may also be the computer program or digital signal to be transmitted via networks, of which telecommunications networks, wired/wireless communications networks, and the Internet are representative, or via data broadcasting, for example.

The present invention may also be a computer system provided with a microprocessor and memory, the memory storing the computer program, and the microprocessor operating in accordance with the computer program.

Also, the present invention may be implemented by an independent computer system by recording the program or the digital signal on the recording medium and transferring the recording medium, or by transferring the program or the digital signal over the above network or the like.

(7) The above embodiments and modifications may be combined with one another.

4. SUMMARY

An aspect of the present invention is a playback device included in a playback system composed of the playback device, a recording medium and a production device. The playback device comprises a first expansion unit expanding a compressed video; a second expansion unit; a shift amount analysis unit analyzing shift amount data; a first shift unit bit-shifting a video; and a synthesis unit synthesizing a plurality of videos, wherein the first expansion unit expands a content read by the playback device, the second expansion unit expands difference data read by the playback device, the shift amount analysis unit analyzes the shift amount data and instructs the first shift unit to bit-shift the content, the first shift unit bit-shifts the content expanded by the first expansion unit in accordance with the instruction of the shift amount analysis unit, and the synthesis unit synthesizes the content bit-shifted by the first shift unit and the difference data expanded by the second expansion unit.

The playback device may further comprise a second shift unit. The shift amount analysis unit may analyze the shift amount data read by the playback device and instruct the second shift unit to bit-shift the content, the second shift unit may bit-shift the difference data expanded by the second expansion unit in accordance with the instruction of the shift amount analysis unit, and the synthesis unit may synthesize the content bit-shifted by the first shift unit and the difference data bit-shifted by the second shift unit.

The shift amount analysis unit may analyze the shift amount data and instruct the first shift unit to bit-shift the content each time the content is played back.

The shift amount analysis unit may analyze the shift amount data and instruct the second shift unit to bit-shift the content each time the content is played back.

Another aspect of the present invention is a production device included in a playback system composed of a playback device, a recording medium, and the production device. The production device comprises: an expansion/shift unit expanding and then bit-shifting a video; a shift amount data generation unit generating shift amount data including a shift amount used when a content and difference data are synthesized; a difference calculation unit calculating a difference between two videos; a compression unit compressing the video; and a recording unit recording data on the recording medium. The expansion/shift unit expands and then bit-shifts the content read by the playback device, the shift amount data generation unit generates the shift amount data based on the shift amount used by the expansion/shift unit, the difference calculation unit calculates a difference between an original video read by the playback device and the content expanded and bit-shifted by the expansion/shift unit to generate difference data, the compression unit compresses the difference data generated by the difference calculation unit to generate compressed difference data, and the recording unit records the compressed difference data on the recording medium.

The shift amount data generation unit may acquire the shift amount and generate the shift amount data holding the shift amount for each video each time the video is produced.

Although there has been a system in which a main content and a sub-content are played back in combination with each other, there is a problem that such a system does not improve color tone expression by restoring information on material lost during the production process of the content. According to the present embodiment, difference information for supplementing the information lost during the production process of the main content is generated separately from the production of the main content, and the difference information is converted so as to have the normal color depth effectively processed by an existing LSI to avoid an excessive increase of the data size of the difference information and a significant design change in the existing LSI. When the difference information is converted, a shift amount at the time of combining the primary content with the difference information is determined so that the color tone of the combination is effectively improved, and meta-information is generated based on the shift amount. At the time of playback, the main content, the difference information, and the meta-information holding the shift amount are played back in combination to play back the content with improved color tone representation as compared to when the main content is played back alone.

An aspect of the present invention is a production apparatus for producing a distribution content including distribution video data, the production apparatus comprising: an original video acquisition circuit configured to acquire original video data; a distribution video acquisition circuit configured to acquire the distribution video data, the distribution video data having been generated by conversion of the original video data to a lower gradation; a difference generation circuit configured to generate difference data between the original video data and the distribution video data; and an output circuit configured to output the difference data.

Another aspect of the present invention is an integrated circuit constituting a production apparatus for producing a distribution content including distribution video data, the integrated circuit comprising: an original video acquisition circuit configured to acquire original video data; a distribution video acquisition circuit configured to acquire the distribution video data, the distribution video data having been generated by conversion of the original video data to a lower gradation; a difference generation circuit configured to generate difference data between the original video data and the distribution video data; and an output circuit configured to output the difference data.

Another aspect of the present invention is a production apparatus for producing a distribution content including distribution video data, the production apparatus comprising: a memory unit storing a computer program composed of a combination of a plurality of computer instructions; and a processor configured to fetch the computer instructions one at a time from the computer program stored in the memory unit, decode the fetched computer instruction, and operate according to a result of the decoding. The computer program causes the processor to perform the steps of acquiring original video data; acquiring the distribution video data, the distribution video data having been generated by conversion of the original video data to a lower gradation; generating difference data between the original video data and the distribution video data; and outputting the difference data.

Another aspect of the present invention is a playback method used in a playback apparatus for playing back a distribution content, the playback method comprising the steps of acquiring difference data; combining the distribution video data and the difference data so as to generate playback video data having a gradation equivalent to the original video data; and playing back the generated playback video data.

Another aspect of the present invention is a computer-readable recording medium having recorded thereon a computer program for playback used in a playback apparatus for playing back a distribution content, the computer program causing a computer to perform the steps of acquiring difference data; combining the distribution video data and the difference data so as to generate playback video data having a gradation equivalent to the original video data; and playing back the generated playback video data.

Another aspect of the present invention is a computer program for playback used in a playback apparatus for playing back a distribution content, the computer program causing a computer to perform the steps of acquiring difference data; combining the distribution video data and the difference data so as to generate playback video data having a gradation equivalent to the original video data; and playing back the generated playback video data.

Another aspect of the present invention is a playback apparatus for playing back a distribution content, the playback apparatus comprising a difference acquisition unit configured to acquire difference data; a combination unit configured to combine the distribution video data and the difference data so as to generate playback video data having a gradation equivalent to the original video data; and a playback unit configured to play back the generated playback video data.

Another aspect of the present invention is a playback apparatus for playing back a distribution content, the playback apparatus comprising a difference acquisition circuit configured to acquire difference data; a combination circuit configured to combine the distribution video data and the difference data so as to generate playback video data having a gradation equivalent to the original video data; and a playback circuit configured to play back the generated playback video data.

Another aspect of the present invention is an integrated circuit constituting a playback apparatus for playing back a distribution content, the integrated circuit comprising a difference acquisition circuit configured to acquire difference data; a combination circuit configured to combine the distribution video data and the difference data so as to generate playback video data having a gradation equivalent to the original video data; and a playback circuit configured to play back the generated playback video data.

Another aspect of the present invention is a production apparatus for producing a distribution content, the production apparatus comprising: a memory unit storing a computer program composed of a combination of a plurality of computer instructions; and a processor configured to fetch the computer instructions one at a time from the computer program stored in the memory unit, decode the fetched computer instruction, and operate according to a result of the decoding. The computer program causes the processor to perform the steps of acquiring difference data; combining the distribution video data and the difference data so as to generate playback video data having a gradation equivalent to the original video data; and playing back the generated playback video data.

INDUSTRIAL APPLICABILITY

A production apparatus according to the present invention generates and outputs data on the difference between original video data and distribution video data, thereby achieving the advantageous effect of allowing a playback apparatus to use the difference data in order to play back a distribution content, which is recorded on a recording medium, with an improved color tone expression as compared to when the distribution content alone is played back. The production apparatus is therefore useful as technology for producing distribution content that includes distribution video data.

REFERENCE SIGNS LIST 10, 10a content distribution system
100, 100a production apparatus
200 recording medium
300 recording medium
400, 400a playback apparatus
500 external storage apparatus
600 distribution server apparatus

The invention claimed is:

1. A reproduction apparatus for reproducing original video data comprising:
   a non-transitory memory device that stores a program; and
   a processing device that executes the program to cause the reproduction apparatus to operate as:
     a read unit configured to read compressed video data from a recording medium;
     an obtaining unit configured to obtain compressed difference data and shift amount data;
     a first decompression unit configured to decompress the compressed video data and to generate decompressed video data;
     a second decompression unit configured to decompress the compressed difference data and to generate decompressed difference data;
     a shift unit configured to shift the decompressed difference data according to the shift amount data and to generate shifted difference data;
     a combining unit configured to combine the decompressed video data with the shifted difference data and to generate combined video data as the original video data; and
     an output unit configured to output the combined video data, wherein
   the shift amount data includes a plurality of pairs of, in one-to-one correspondence, a frame number uniquely identifying a frame and a shift amount for the frame, and
   the shift unit shifts, for each frame, the decompressed difference data by increasing a bit length of primary color data, wherein the bit length is determined according to the shift amount.

2. The reproduction apparatus of claim 1, wherein
   the compressed video data is generated by compressing video data, the video data being generated by conversion of original video data to a lower gradation, the conversion performed for each pixel,
   the compressed difference data is generated by:
   (i) calculating a difference between the original video data and the video data, the original video data and the video data both including a plurality of frames, each frame including a plurality of pixels, each pixel including primary color data for each primary color, and the difference being calculated for each primary color of each pixel of each frame;
(ii) generating primary color data by reducing a bit length of the difference; and
(iii) compressing difference data, the difference data including a plurality of frames, each frame including a plurality of pixels, each pixel including, for each primary color, the primary color data, and
the shift amount data indicates the number of reduced bits.

3. The reproduction apparatus of claim 2, wherein
the combining unit performs the combining by merging primary color data in the decompressed video data and corresponding primary color data in the shifted difference data, the decompressed video data and the shifted difference video data both including a plurality of frames, each frame including a plurality of pixels, each pixel including primary color data for each primary color.

4. The reproduction apparatus of claim 2, wherein
the output unit performs the outputting by playing back and displaying the combined video data.

5. The reproduction apparatus of claim 2, wherein
the obtaining unit reads the compressed difference data and the shift amount data from the recording medium.

6. The reproduction apparatus of claim 2, wherein
the obtaining unit receives the compressed difference data and the shift amount data from a distribution server.

7. A content distribution system including a production apparatus and a reproduction apparatus, the production apparatus being for producing a distribution content including distribution video data, and the reproduction apparatus being for reproducing original video data,
the production apparatus comprising:
a first non-transitory memory device that stores a first program; and
a first processing device that executes the first program to cause the production apparatus to operate as:
an original video acquisition unit configured to acquire the original video data; a distribution video acquisition unit configured to acquire the distribution video data, the distribution video data having been generated by conversion of the original video data to a lower gradation; a difference calculation unit configured to calculate a difference between primary color data in the original video data and primary color data in the distribution video data, the original video data and the distribution video data both including a plurality of frames, each frame including a plurality of pixels, each pixel including primary color data for each primary color, and the difference being calculated for each primary color of each pixel of a frame being processed; a shift amount generation unit configured to generate shift amount data including a shift amount for the frame being processed by determining the shift amount in accordance with a value of one or more most significant bits, other than a sign bit, in the difference calculated by the difference calculation unit; a reduction unit configured to generate difference data by reducing a bit length of the difference calculated by the difference calculation unit in accordance with the shift amount determined by the shift amount generation unit for the frame being processed; and an output unit configured to output the difference data and the shift amount data, wherein the difference data includes a plurality of frames, each frame including a plurality of pixels, each pixel including, for each primary color, the difference whose bit length is reduced by the reduction unit, the shift amount data includes a plurality of pairs of, in one-to-one correspondence, a frame number uniquely identifying a frame and the shift amount for the frame determined by the shift amount generation unit, and the output unit performs the output by writing the distribution video data, which includes compressed video data, on a recording medium and writing the compressed difference data and the shift amount data on the recording medium in association with the distribution content,
the reproduction apparatus comprising:
a second non-transitory memory device that stores a second program; and
a second processing device that executes the second program to cause the reproduction apparatus to operate as:
a read unit configured to read the compressed video data, the compressed difference data, and the shift amount data from the recording medium; a first decompression unit configured to decompress the compressed video data and to generate decompressed video data; a second decompression unit configured to decompress the compressed difference data and to generate decompressed difference data; a shift unit configured to shift the decompressed difference data according to the shift amount data and to generate shifted difference data; a combining unit configured to combine the decompressed video data with the shifted difference data and to generate combined video data as the original video data; and an output unit configured to output the combined video data.

8. A content distribution system including a production apparatus and a reproduction apparatus, the production apparatus being for producing a distribution content including distribution video data, and the reproduction apparatus being for reproducing original video data, the production apparatus comprising:
a first non-transitory memory device that stores a first program; and
a first processing device that executes the first program to cause the production apparatus to operate as:
an original video acquisition unit configured to acquire the original video data; a distribution video acquisition unit configured to acquire the distribution video data, the distribution video data having been generated by conversion of the original video data to a lower gradation; a difference calculation unit configured to calculate a difference between primary color data in the original video data and primary color data in the distribution video data, the original video data and the distribution video data both including a plurality of frames, each frame including a plurality of pixels, each pixel including primary color data for each primary color, and the difference being calculated for each primary color of each pixel of a frame being processed; a shift amount generation unit configured to generate shift amount data including a shift amount for the frame being processed by determining the shift amount in accordance with a value of one or more most significant bits, other than a sign bit, in the difference calculated by the difference calculation unit; a reduction unit configured to generate difference data by reducing a bit length of the difference calculated by the difference calculation unit in accordance with the shift amount determined by the shift amount generation unit for the frame being processed; and an output unit configured to output the difference data and the shift amount data, wherein the difference data includes a plurality of frames, each frame including a plurality of pixels, each pixel including, for each primary color, the difference whose bit length is reduced by the reduction unit, the shift amount data includes a plurality of pairs of, in one-to-one correspondence, a frame number uniquely identifying a frame and the shift amount for the frame determined by the shift amount generation unit, and the output unit performs the output by writing the distribution video data, which includes compressed video data, on a recording medium and transmitting the compressed difference data and the shift amount data to a distribution server in association with the distribution content, the reproduction apparatus comprising:

a second non-transitory memory device that stores a second program; and a second processing device that executes the second program to cause the reproduction apparatus to operate as:

a read unit configured to read the compressed video data from the recording medium; an obtaining unit configured to obtain the compressed difference data and the shift amount data from the distribution server; a first decompression unit configured to decompress the compressed video data and to generate decompressed video data; a second decompression unit configured to decompress the compressed difference data and to generate decompressed difference data; a shift unit configured to shift the decompressed difference data according to the shift amount data and to generate shifted difference data; a combining unit configured to combine the decompressed video data with the shifted difference data and to generate combined video data as the original video data; and an output unit configured to output the combined video data.

* * * * *